(12) United States Patent
Kalavade et al.

(10) Patent No.: US 7,782,848 B2
(45) Date of Patent: *Aug. 24, 2010

(54) METHOD AND APPARATUS FOR CONVERGING LOCAL AREA AND WIDE AREA WIRELESS DATA NETWORKS

(75) Inventors: Asawaree Kalavade, Gillette, NJ (US); Hong Jiang, Westfield, NJ (US); Penny Chen, Basking Ridge, NJ (US)

(73) Assignee: Tatara Systems, Inc., Acton, MA (US)

( * ) Notice: Subject to any disclaimer, the term of this patent is extended or adjusted under 35 U.S.C. 154(b) by 602 days.

This patent is subject to a terminal disclaimer.

(21) Appl. No.: 11/772,390

(22) Filed: Jul. 2, 2007

(65) Prior Publication Data

US 2008/0031211 A1    Feb. 7, 2008

Related U.S. Application Data

(63) Continuation of application No. 10/173,084, filed on Jun. 17, 2002, now Pat. No. 7,239,632.

(60) Provisional application No. 60/299,126, filed on Jun. 18, 2001.

(51) Int. Cl.
*H04L 12/28* (2006.01)
*H04L 12/56* (2006.01)

(52) U.S. Cl. .................................................. 370/389

(58) Field of Classification Search ................ None
See application file for complete search history.

(56) References Cited

U.S. PATENT DOCUMENTS

| | | | |
|---|---|---|---|
| 5,533,098 A | 7/1996 | Lee et al. | |
| 5,761,425 A | 6/1998 | Miller | |
| 5,790,548 A | 8/1998 | Sistanizadeh et al. | |
| 5,842,122 A | 11/1998 | Schellinger et al. | |
| 6,061,346 A | 5/2000 | Nordman et al. | |
| 6,256,498 B1 | 7/2001 | Ludwig et al. | |
| 6,317,421 B1 | 11/2001 | Wilhelmsson et al. | |
| 6,389,008 B1 | 5/2002 | Lupien et al. | |
| 6,493,328 B2* | 12/2002 | Fong et al. | .......... 370/329 |
| 6,647,426 B2 | 11/2003 | Mohammed | |
| 6,769,000 B1 | 7/2004 | Akhtar et al. | |
| 6,789,110 B1 | 9/2004 | Short et al. | |
| 6,912,389 B2 | 6/2005 | Bright et al. | |
| 7,039,025 B1* | 5/2006 | Menon et al. | .......... 370/328 |
| 2001/0036164 A1 | 11/2001 | Kakemizu et al. | |
| 2002/0045428 A1* | 4/2002 | Chesson | .......... 455/115 |
| 2002/0169858 A1 | 11/2002 | Bellinger et al. | |
| 2003/0197607 A1 | 10/2003 | Striemer | |

FOREIGN PATENT DOCUMENTS

EP    1011278    6/2000

OTHER PUBLICATIONS

Office Action issued for EP 02742141.1 dated Oct. 13, 2008.

* cited by examiner

*Primary Examiner*—Raj Jain
(74) *Attorney, Agent, or Firm*—Fulbright & Jaworski L.L.P.

(57) ABSTRACT

A converged network accessible by wireless client devices includes a wide area wireless network, a local area wireless network, and a gateway linked to the wide area and local area wireless networks for integrating access to the networks by the wireless client devices.

7 Claims, 20 Drawing Sheets

METHOD AND APPARATUS FOR CONVERGING LOCAL AREA AND WIDE AREA WIRELESS DATA NETWORKS

RELATED APPLICATION

This application is a continuation of Ser. No. 10/173,084, filed Jun. 17, 2002 now U.S. Pat. No. 7,239,632, which application was based on Ser. No. 60/299,126, filed Jun. 18, 2001.

BACKGROUND OF THE INVENTION

1. Field of the Invention

The present invention relates generally to wireless data networks and, more particularly, to a method and apparatus for converging local area and wide area wireless data networks.

2. Description of Related Art

Wireless data technologies are used to provide Internet and other network access to mobile client devices such as, e.g., laptops, personal digital assistants (PDAs), and smartphones. With the growing popularity of the Internet and the increasing mobility demands from end users, there has recently been increased interest and activity in wireless data networks. Some wireless data technologies are designed to support wide area coverage, while others are designed for the local area.

In the wide area, cellular operators such as AT&T are presently deploying high-speed packet based wireless wide area networks (WANs). Older wide area wireless data technologies have used Cellular Digital Packet Data (CDPD) and circuit switched data. While these older technologies offer coverage over a large area, they are limited in the bit rates offered (.about. 20 kbps) and accordingly somewhat restrict the types of applications that could be accessed. With the advent of higher-speed technologies such as General Packet Radio Service (GPRS) and Wideband Code Division Multiple Access (WCDMA), cellular operators are now building out wireless data networks that will provide moderately high speed (.about. 100 kbps) access to the Internet. These networks are based on the so-called 2.5 G wireless data technologies, such as GPRS and 1×RTT. It is expected that these wireless data technologies will provide convenient access to the Internet over a large coverage area, with each base station in the network typically covering up to several miles. Due the relatively higher bit rate, various applications are now envisioned that will extend the reach of the Internet to the wireless world. Users are expected to access these networks through various client devices such as next-generation smart phones as well as PDAs and laptops with 2.5 G network interface cards.

In the local area, enterprises and universities are now deploying wireless local area networks (LANs) based on the IEEE 802.11b standard. Users with client devices such as laptops and PDAs use an 802.11 network interface card that enables them to access the Internet without having to be attached to a desktop. The current 802.11 technology allows access at speeds up to 11 Mbps over a range of several hundred feet. In addition to replacing traditional Ethernet-based local area networks, these wireless LANs are now also being deployed in novel settings. Of special interest is the increasing deployment of these 802.11 based networks in public spaces and hot spots such as, e.g., airports, convention centers, hotels, and even local coffee shops. These hotspots promise to provide localized wireless access at fast speeds. The hotspots are typically managed by local wireless Internet service providers (ISPs) such as, e.g., Wayport or by wireless LAN infrastructure integrators such as, e.g., Concourse Communications.

Advantages of WANs include wide coverage and "always on" access. These networks typically cover large areas of several miles. Due to the packet-based nature and the large coverage areas of these networks, 2.5 G enables data access all the time.

Disadvantages of wide area networks include limited bit rate and expensive equipment. Compared with the data speeds of several Mbps typically available in enterprises today as well as the 11 Mbps rate offered by 802.11b, the data rates achievable with 2.5 G are quite limited. For example, most 2.5 G networks will offer data rates of only up to 144 kbps. Also, the equipment needed to deploy the 2.5 G networks is quite expensive, in line with costs of traditional carrier-scale switching systems. A base station, e.g., can typically cost several hundred thousand dollars.

Advantages of the 802.11 LANs include a high data rate and inexpensive equipment. Relative to the 2.5 G networks, the wireless 802.11 LANs can support peak data rates of up to 11 Mbps in current generation technology. Further enhancements to this technology can support up to 54 Mbps data rates as well (802.11g and 802.11a). The cost of 802.11 equipment is also quite reasonable, and is typically a couple of orders of magnitude below that of the WAN networks. Also, the 802.11 networks operate in the unlicensed band. As a result, there are no spectrum acquisition costs associated with wireless LAN deployments.

Disadvantages of 802.11 based networks are limited coverage and no "always on" access. The coverage of each 802.11 base station (called access point) is typically limited to 150-200 ft. Also, since the coverage areas are limited, it is prohibitively expensive to deploy 802.11 based networks over large areas. As a result, it is not practical to obtain the same benefit of 'always on' access for these networks.

BRIEF SUMMARY OF EMBODIMENTS OF THE INVENTION

Some embodiments of the invention are directed to a converged network accessible by wireless client devices. The converged network includes a wide area wireless network, a local area wireless network, and a gateway linked to the wide area and local area wireless networks for integrating access to the networks by the wireless client devices.

Some embodiments of the invention are directed to a gateway for converging access by wireless client devices to a wide area wireless network and to a local area wireless network. The gateway is linked to the networks and emulates an interface in the wide area network.

Some embodiments of the invention are directed to a method of operating a wide area wireless network to provide users of wireless client devices integrated access to the wide area wireless network and to a local area wireless network. The method includes detecting the presence of a wireless client device in a coverage area of the local area wireless network, authenticating the user of the wireless client device, and enabling the user to access the local and wide area wireless networks when authenticated.

These and other features will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

DETAILED DESCRIPTION OF PREFERRED EMBODIMENTS

Figure 1:
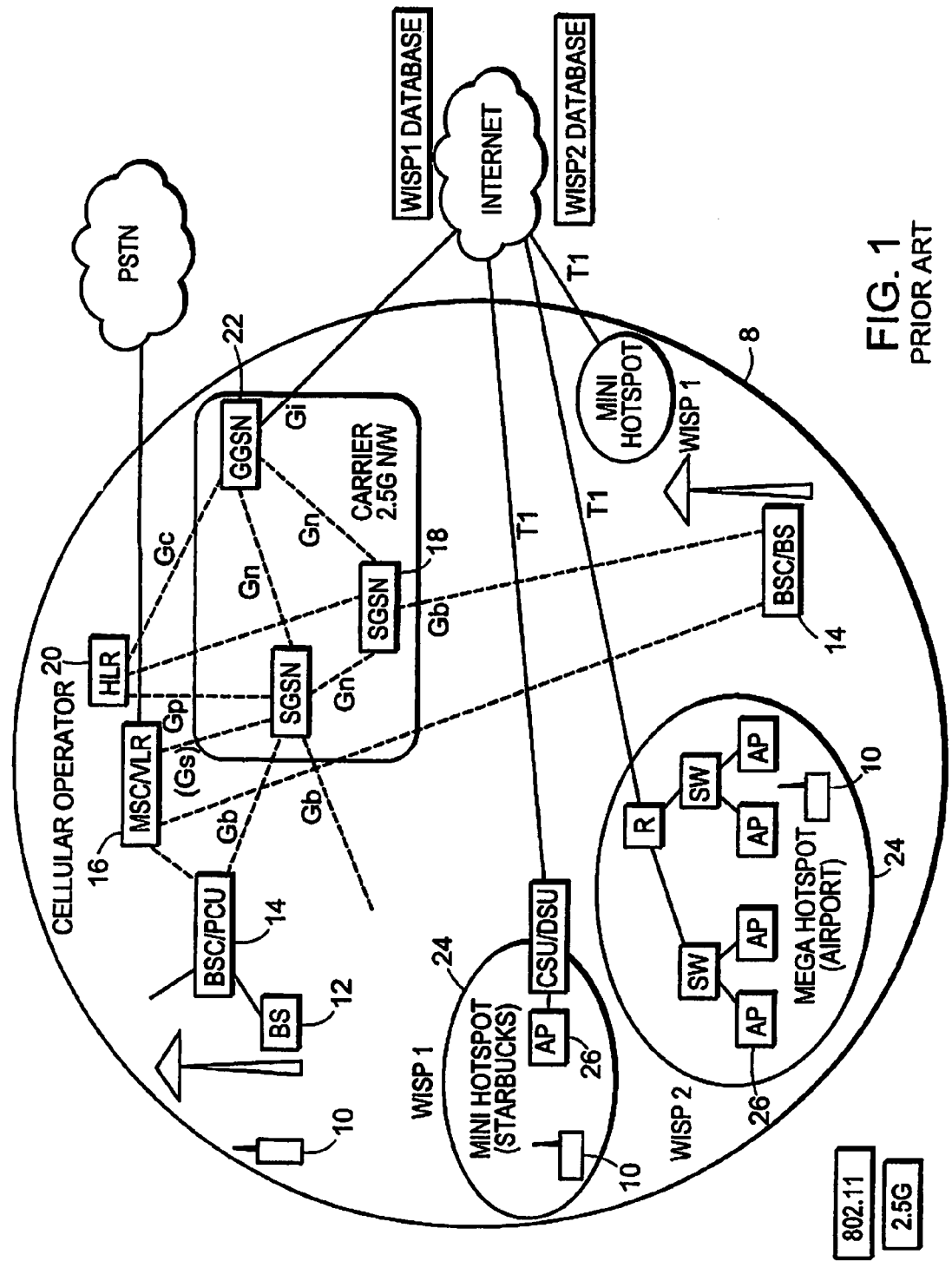
FIG. 1 is a schematic diagram illustrating the system architecture for a GPRS network in accordance with the prior art.

The present invention is generally directed to a method and apparatus for integrating wide area and local area wireless networks operated, e.g., by wireless carriers and hotspot operators, respectively. Various types or levels of integration can be provided such as, e.g., AAA integration, traffic integration, and session integration. Briefly, AAA integration is the integration of the authentication, authorization, and accounting functions so that use of both the local and wide area networks by a client user is authenticated and billed by one party, e.g., the 2.5 G carrier's network. Traffic integration enables traffic and services from the carrier's network to be available to the 802.11 user within the hotspot operator's network. Session integration enables the user to have a seamless session as he moves from one network to another. Integration can be achieved using a client software that runs on the 802.11 access device and a server component that is deployed close to or at the carrier's network and links into the carrier's network.

In accordance with various embodiments, a converged environment is provided where hotspots and the wide area networks merge with each other. The following scenario illustrates one example of the use of such a converged environment: A business user arrives at a hotspot such as, e.g., one at an airport. At the airport, the user gets access to high-speed data using a wireless LAN technology. The user then boards a rental car shuttle and drives away from the airport and out of the LAN coverage area. Since there is no wireless LAN coverage on the way to the rental car pick up location, the user switches to available wide area technology, such as 2.5 G, and continues to access the Internet and run applications without interruption, although at a lower speed. At the rental car pickup, 802.11 access is available, and the user transparently switches to the high-speed network access method. The user then drives to the hotel, using the wide area 2.5 G network on the way. Finally, there is a 802.11 deployment at the hotel, and the user switches back to that. Thus, by enabling convergence, the end-user can use the most appropriate access technology available at a given location. At locations where there is 802.11 access, the user uses that to get high-speed connectivity. When there is no access, the user still gets coverage by connecting through the wide area. Further, the user preferably gets a single bill from a single carrier itemizing the usage at different hot spots. Due to its lower installation cost, 802.11 based access will typically cost much less than the 2.5 G access.

Convergence benefits can also be applied to enterprises, which can provide access to their services from both local and wide area networks.

As previously mentioned, multiple types or levels of convergence of the wireless LANs and WANs can be achieved. The so-called AAA integration is the integration of the authentication, authorization, and accounting systems of the wireless LAN and WAN networks. Currently, wireless ISPs manage the authentication and billing for wireless LAN usage, while cellular operators manage billing and authentication for the 2.5 G usage. It would be advantageous for end users to have only one entity providing billing and authentication when both networks are used. This makes it convenient for the user by not requiring him to get accounts with different wireless ISP's that may be running different hot spots. Further, this integration also delineates customer ownership. A cellular operator can become the "owner" of the end customer by providing an integrated billing system. This system can allow the end user to be associated with a single field in the carrier's billing table.

Through this level of integration, the cellular operators' database authenticates a wireless LAN user, who is also a cellular customer.

Traffic integration between LAN and WAN networks allows traffic and services from the 2.5 G network to be accessible within the hotspot LAN network. Examples of such services can include push-based applications such as paging and messaging that are offered by the cellular operator. While these services can be accessed from the cellular network, they cannot be easily accessed from the LAN. By allowing traffic to flow from the carrier's network into the wireless LAN network, these services can be made accessible to wireless LAN users in the hotspot.

Because of their larger installed base of users, carriers are typically able to more affectively broker relationships with various application providers compared to smaller hotspot operators. Accordingly it is often difficult for hotspot operators to provide the same rich set of applications and services to their users. By integrating traffic flows, the end user can get access to these applications within hotspots as well.

Session integration is another level or type of integration between the LAN and the WAN. Through this level of integration, seamless connectivity can be provided as a user moves from one network to the other. In other words, the user maintains a session, no matter what access mechanism he is using. A dual mode terminal that can dynamically switch between the two air interfaces can be used to provide session integration.

Network Architecture for Existing WAN and LAN Systems

Currently, 2.5 G wide area wireless networks co-exist with 802.11 based local area network hotspots, with no interaction between the two networks. FIG. 1 illustrates current generation wireless data architecture. The upper part of FIG. 1 illustrates the typical system architecture for a GPRS-based 2.5 G network technology. This general architecture is functionally similar for other wireless WAN technologies such as CDMA-based 1×RTT technology. A GPRS-based architecture is described for ease of explanation, but it should be understood that various embodiments of the invention can also be used with the 1×RTT technology and other wireless technologies.

The 2.5 G GPRS network 8 architecture is typically managed by a cellular operator such as, e.g., AT&T Wireless. This network can support voice as well as data transactions. Mobile stations (MS) 10, which are also described herein as wireless client devices (such as, e.g., laptops, cell phones or PDAs with a GPRS NIC), connect to a base station (BS) 12. Multiple base stations 12 connect into a base station controller (BSC) 14. Voice traffic is sent from the BSC 14 to the Mobile Switching Center (MSC) 16. A Packet Control Unit (PCU) installed at the BSC 14 separates out data traffic coming from the MS 10. The data traffic is managed by the cellular operator's wireless data network. More, specifically, the data traffic goes to a SGSN (Serving GPRS Service Node) 18. A carrier's network typically has multiple SGSNs. The SGSNs authenticate mobile users by querying an HLR 20 (Home Location Register) database. The SGSN 18 is also responsible for managing traffic, and it routes data traffic over the carrier's GPRS network to a Gateway GPRS Service Node (GGSN) 22. The GGSN 22 is a border router which routes traffic to and from the GPRS network into the public Internet. As a user moves across cells, the user becomes associated with different SGSNs. The SGSNs are responsible for managing the mobility of the user. FIG. 1 shows specific interfaces between different elements of the WAN network 8. These interfaces are defined by the GPRS standard published by the ETSI and the 3GPP.

The lower portion of FIG. 1 shows the network architecture for local wireless LANs 24 deployed, e.g., in hot spot locations. As mentioned earlier, hotspots can be deployed at various locations such as, e.g., at airports, convention centers, and in the local coffee shops. Hotspots can be classified into two general categories: mini hotspots and mega hotspots. A mini hotspot is a relatively small deployment such as, e.g., in a coffee shop. A mini hot spot deployment typically comprises a single wireless LAN 802.11 based access point (AP) 26 and provides connectivity into the Internet typically over a DSL, T1, or a leased line. A mega hotspot is a deployment that supports a set of access points and covers a moderate sized area such as, e.g., a convention center. Such a deployment typically has multiple APs connected through Ethernet switches and a router to the public Internet typically over a T1 or a leased line.

The hotspots are typically managed and operated by wireless ISP's (WISP) or wireless system integrators. Users with laptops or PDA's with 802.11 based network interface cards (NIC's) can use the 802.11 based wireless network to access the Internet.

Users are typically authenticated by the hotspot operator's AAA system that typically uses RADIUS (RFC 2865, 2866).

LAN/WAN Integration Using a CWG

Currently, WANs 8 operated by cellular carriers and LANS 24 operated by wireless ISPs are separate, i.e., not integrated. Each operator manages its own network and has its own customers. Various embodiments of the present invention are directed to converging the wide area and local area wireless networks through an appliance called the Converged Wireless Gateway (CWG).

Briefly, the CWG enables integration at various levels including (1) authentication of the wireless LAN user against his profile in the GPRS network; (2) enabling GPRS services and traffic to flow through the wireless LAN hotspot; and (3) managing seamless sessions between GPRS and wireless LAN.

Figure 2:
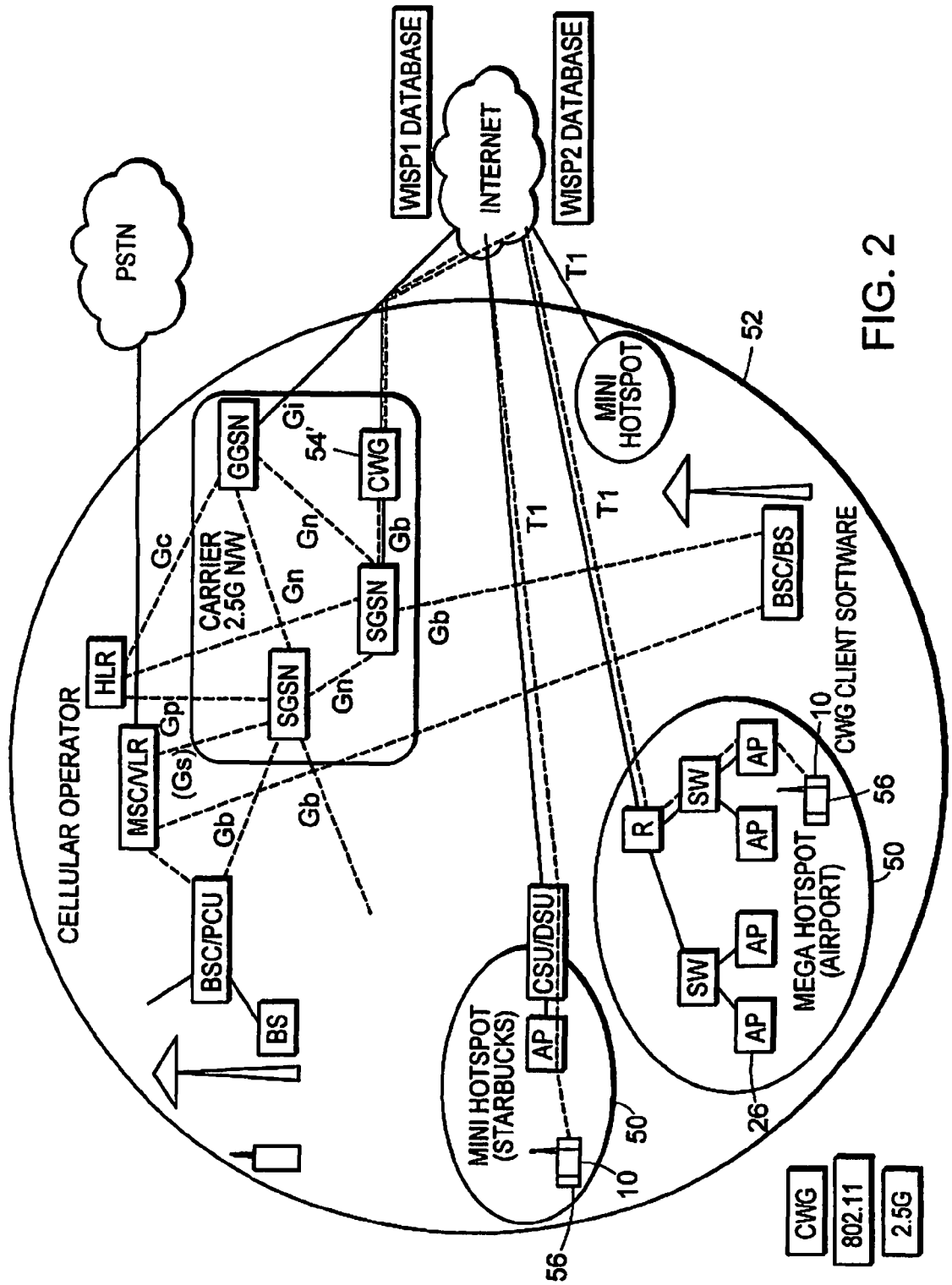
FIG. 2 is a schematic diagram illustrating the system architecture for a converged network using a converged wireless gateway (CWG) for base station emulation in accordance with some embodiments of the invention.
Figure 3:
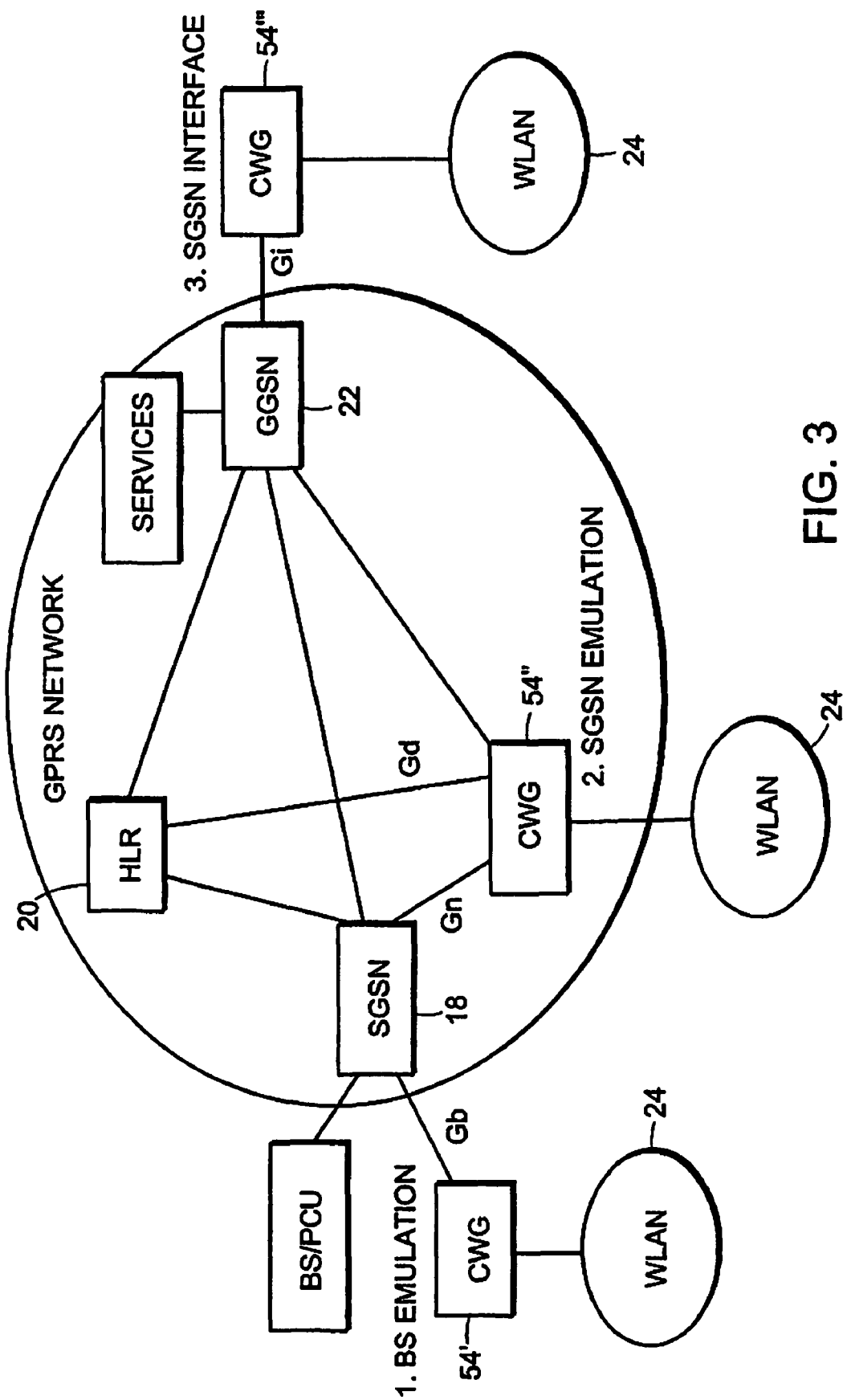
FIG. 3 is a schematic diagram illustrating deployment of CWGs in accordance with various alternate embodiments on the invention.

FIG. 2 generally illustrates the system architecture for integrating LANs 50 with WANs 52 in accordance with some embodiments of the invention. In these embodiments, convergence is achieved using a CWG 54 and a CWG client 56. The CWG 54 is a gateway between the wireless LAN 50 and the GPRS network 52. The CWG 54 can be deployed in multiple ways by emulating different interfaces within the GPRS network 52 as illustrated in FIG. 3.

A CWG 54' can be deployed, e.g., by emulating a basestation/packet control unit (BS/PCU) and connecting to the SGSN 18 within the GPRS network. Through this design, the CWG 54' can make a wireless LAN hot spot look like a GPRS cell to the SGSN. To accomplish this, the CWG emulates several functions within the mobile station, the BS, and the PCU. By masquerading as a GPRS cell, this design enables the wireless LAN cell to leverage several key features and functionalities within the GPRS network. In particular, it can leverage the authentication and mobility management capabilities of the SGSN.

Alternatively, a CWG 54" can be deployed by emulating a SGSN and by connecting to the GGSN 22 and other SGSNs 18 in the GPRS network. From the GPRS network perspective, the CWG 54" looks like a SGSN, while from the LAN side, the CWG looks like a LAN interface. In this approach, the CWG emulates the SGSN and can leverage the mobility management infrastructure of the GPRS network.

As a further alternative, a CWG 54''' can be deployed as a GGSN interface. In this approach, the CWG connects to the GGSN 22 from the external side, as against the GPRS network side. In this case, the CWG is a gateway that connects to the GGSN and leverages authentication infrastructure within the GPRS network.

A CWG client 56 is installed on the MS 10. The client software can include information downloaded by the operator when the user first subscribes to hotspot access. The client is responsible for conveying identification information as well as for assisting in traffic and mobility management. Note that the client software is generally needed to provide session and traffic integration and is optional if only AAA integration is desired. If present, however, the client software communicates with the CWG to authenticate the user with the GPRS network.

The following is a more detailed description of the CWG deployment using BS emulation. (Description of CWG deployment using SGSN emulation and GGSN emulation in accordance with alternate embodiments will be provided further below). The CWG connects the hotspot to the SGSN in the GPRS network. When connecting to the SGSN, the CWG can emulate the standard interface used by native GPRS base stations connecting into the SGSN. Specifically, the CWG can connect to the SGSN over a frame relay connection, as specified by the GPRS standard. This link can be defined to be the Gb interface as per the GPRS specifications (3GPP TS23.060).

Each CWG can have a frame relay connection to interface with the SGSN. There are several possible locations where the CWG can be deployed including, e.g., the following: (1) at the hotspot, connected to an edge router; (2) at an ISP POP or data center; (3) hosted anywhere on the Internet; and (4) within the carrier's premises or in proximity to the SGSN.

While any of these deployments can be used, locations (3) and (4) are preferred. This design choice simplifies the deployment of the CWG since it is not necessary to provision additional T1 or E1 connections from each hotspot area. Also, this architecture permits users from different carriers to access a given hotspot without requiring each carrier to provision a CWG interface at each hotspot.

Figure 4:
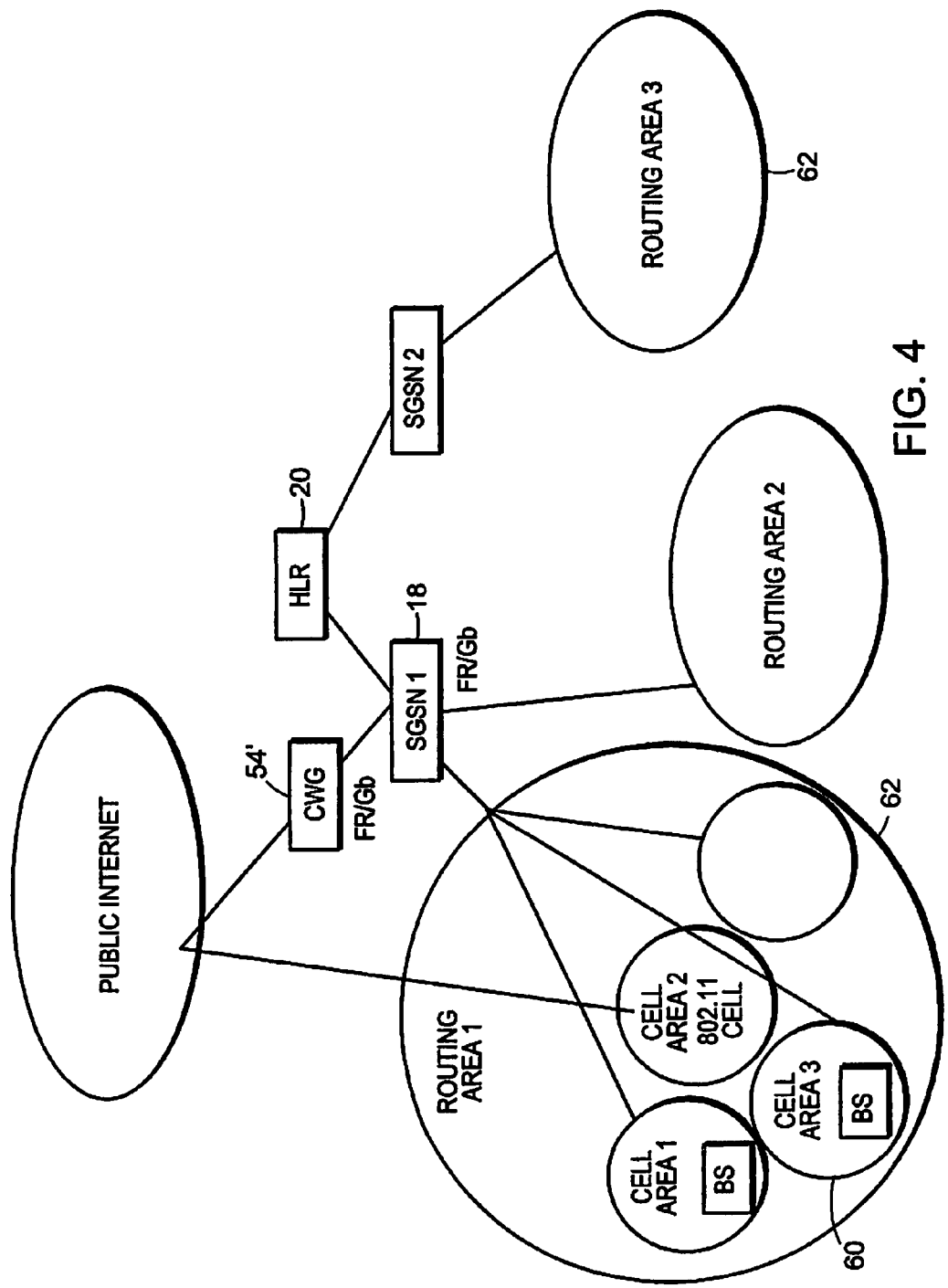
FIG. 4 is a schematic diagram illustrating CWG emulation of a GPRS cell in accordance with some embodiments of the invention.

FIG. 4 describes this system design in greater detail. In a typical GPRS network, multiple GPRS cells 60 typically are grouped into a routing area 62. One or more routing areas are controlled by a SGSN 18. SGSNs communicate with the HLR 20 to get authentication information.

The CWG 54' can be connected between an 802.11 cell and the SGSN 18. In a preferred embodiment, the CWG is located within or close to the carrier premises. A Frame Relay link is provisioned between the CWG and the SGSN. The hotspot users connect to the CWG over the public Internet or via a dedicated connection. The CWG makes the 802.11 cell appear to the SGSN as any other GPRS cell.

Typically, a few hotspots will be associated with a CWG. This association can be based on geographic proximity. This CWG in turn is connected to the most proximate SGSN. A CWG connects to only one SGSN. More than one CWG may be connected to a particular SGSN.

A more detailed description is provided below of the operation of a CWG based system.

1. To use the converged networks, the end user typically signs up with his wireless operator (e.g., AT&T wireless) to start using 802.11 hotspots. This can be done, e.g., through a web interface.

2. The operator downloads a relatively simple client software on the user's 802.11 device. The client software is used for managing the sessions between the LAN and the WAN. The client may optionally include the user's identification within the GPRS network. The user's identification can be encrypted and stored in non-volatile memory on the 802.11 device. In some embodiments, the client is not used if, e.g., only AAA integration is desired.

3. The CWG client detects the presence of a CWG when it comes within an 802.11 hotspot affiliated with the converged network. Specifically, the CWG gateway can periodically broadcast beacons advertising its presence. If the CWG client detects a CWG broadcast message, it requests authentication with the CWG.

4. The 802.11 hotspot can be configured to let the authentication messages from the CWG client go out of the network. (Currently, the 802.11 hotspot will authenticate its users before letting any traffic go out of the hotspot.)

5. The CWG, in turn, requests authentication with the GPRS network on behalf of the 802.11 user, by presenting itself as a GPRS client to the SGSN.

6. The CWG goes through the authentication process with the GPRS network through the SGSN. The SGSN authenticates the user. The CWG then conveys the authentication to the CWG client and enables the user to access the GPRS network as if it were a GPRS user. Once authenticated, the CWG also enables traffic to be routed from the 802.11 network over the GPRS network.

7. When the user sends traffic, certain services and applications are allowed to go through the carrier's network. These services are identified within the client software. Other traffic is routed over the public Internet directly.

The key functionality of the CWG can therefore be summarized as follows: (1) logical emulation of a GPRS mobile station; and (2) physical emulation of a GPRS Base Station and Packet Control Unit.

The CWG architecture has several advantages. First, it provides easy access to the HLR. By emulating the MS to the SGSN, the CWG can access authentication information within the HLR by leveraging the SGSN. It does not have to replicate any of these functions or tap into the database itself. Second, the CWG architecture facilitates mobility management. By leveraging the SGSN infrastructure, it is possible to achieve seamless mobility. As the end user moves from a GPRS cell to a CWG-controlled 802.11 cell, the SGSN manages the mobility as if the user were moving between GPRS cells. Third, the CWG can be easily deployed. The architecture of locating CWG close to carrier's network makes it possible to share the CWG among multiple hotspots, and does not require special provisioning within each deployment. Fourth, the CWG provides multi-carrier support. Since a CWG is not required at each hotspot, users from multiple carriers can access a hotspot location. The client directs the traffic to the appropriate CWG in the corresponding carrier's network.

The three primary parties involved in the converged operation are the end-user, the hotspot operator, and the carrier. To enable converged network access, each will generally to make some changes to their respective system. For example, as will be described below, the end-user runs a CWG client, which can be downloaded when the user signs up for the CWG service. Also, the hotspot operator may need changes to allow roaming users to pass through its network. Specifically, users who do not belong to the hotspot ISP should be able to get authenticated with the carrier and their traffic should subsequently be passed through. Also, the wireless carrier will deploy the CWG to enable the convergence. The CWG is set up initially to connect to the appropriate network elements. It should also be configured to broadcast itself to the hotspots.

Figure 5:
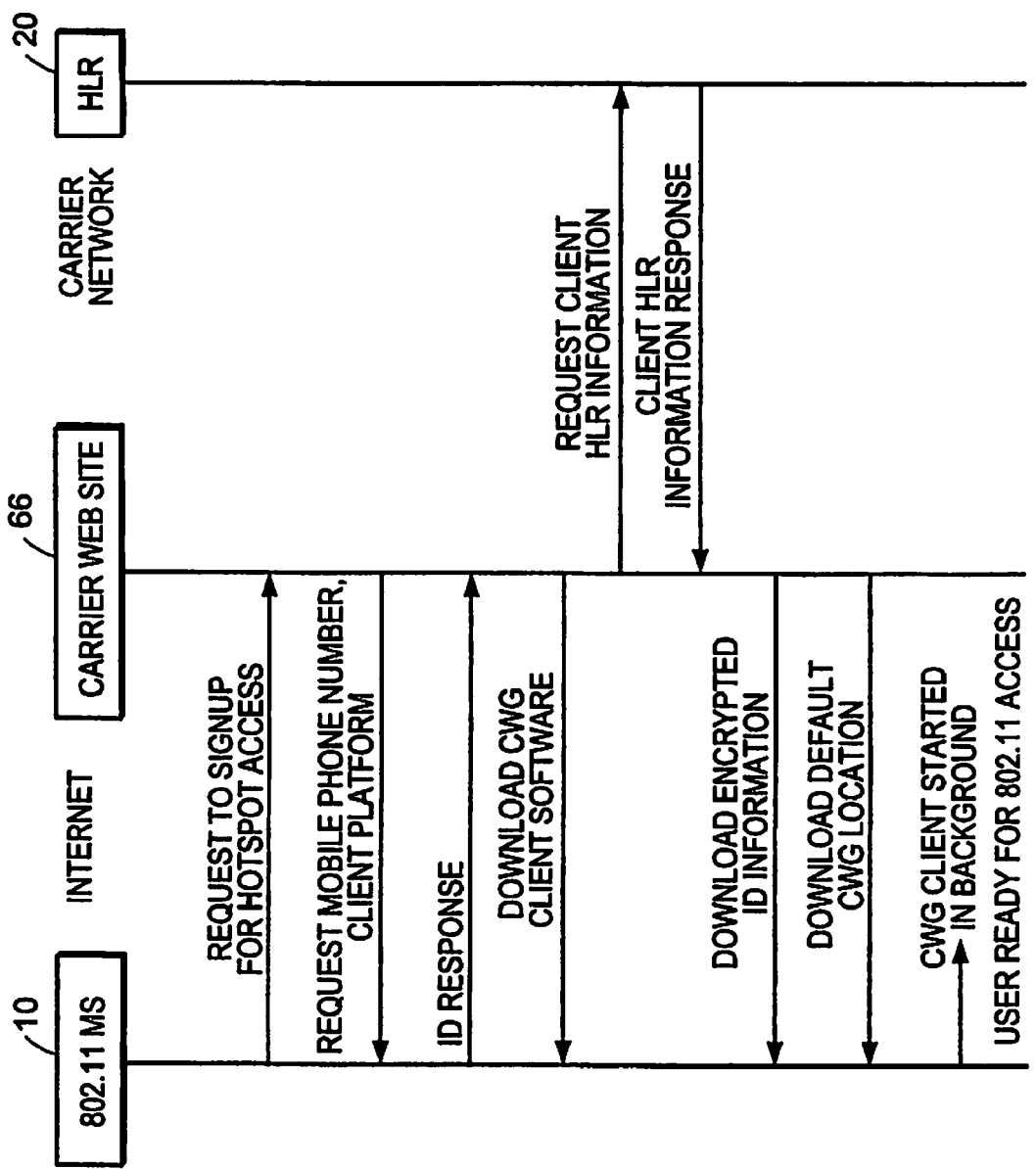
FIG. 5 is a diagram illustrating a client initialization process in accordance with some embodiments of the invention.

As mentioned previously, the 802.11 user can sign up with the wireless WAN operator to get access to hotspot locations. An example procedure for this user initialization is described in FIG. 5. The user can first contact the WAN cellular operator (e.g., the cellular operator's web site 66) to register for hot spot access. The carrier requests user information such as, e.g., his mobile phone number, the type of device he will use to access the network from, etc. On receiving the response, the carrier downloads the appropriate client software 56 on the user's device 10. The client can support various user devices 10 such as PDAs and laptops. The carrier also receives the user's information in the 2.5 G network from the HLR 20. This information is then encrypted and stored onto the user's device 10. A "soft authentication" approach is preferably used. Alternatively, the user can be authenticated through other mechanisms such as login/password or a hardware SIM. The carrier also sets up default CWG locations within the client software. (To subsequently modify the client software, the CWG 54' can trigger automatic updates and downloads depending on the version of the client software.) Once this initial setup is done, the client is ready to access the GPRS network.

Currently, most hotspot operators control access to the hotspot. A user is expected to sign up for hotspot usage with a wireless ISP. When the user comes to the hotspot and starts transmitting data, the hotspot intercepts the traffic. It queries the user for a login/password before letting traffic pass through. Once the user is authenticated, the hotspot allows that user to access the network.

The hotspot can be programmed to allow the CWG authentication messages to go through to the public network (to the CWG). Once the user is authenticated, it can allow the traffic from the user to flow through. Also, the hotspot device can be configured to broadcast the CWG beacon messages. These features can be supported relatively easily within existing authentication mechanisms supported by the hotspot. Most hotspot operators today deploy the hotspot with a NAS (Network access server) that blocks user traffic before authentication. The CWG can be designed to interface with the NAS.

The CWG client sends identification information to the CWG. It can also assist in other mobility and billing functions as described below.

The client is designed to start its operation when it detects a CWG. This ensures that the CWG functions are active only in designated convergent areas (and not in every place that might have a 802.11 deployment such as a home). As a result, the CWG needs to announce its presence to CWG clients. This can be accomplished using beacons, which the CWG can periodically send out. A beacon is typically a short IP packet that gives its location. The default beacon interval is 100 ms but it can be changed as desired.

The CWG client listens to these beacons to recognize whether it is in a hotspot that is covered by the CWG and starts activating itself with the GPRS network through the CWG. Since the CWG is typically not located within the hotspot, it is important for the CWG's beacons to reach the hotspot. To accomplish this, the CWG can be programmed with locations of all hotspots that are enabled to access the GPRS network. As more hotspots sign up for CWG access, these locations are programmed within the CWG.

Figure 6:
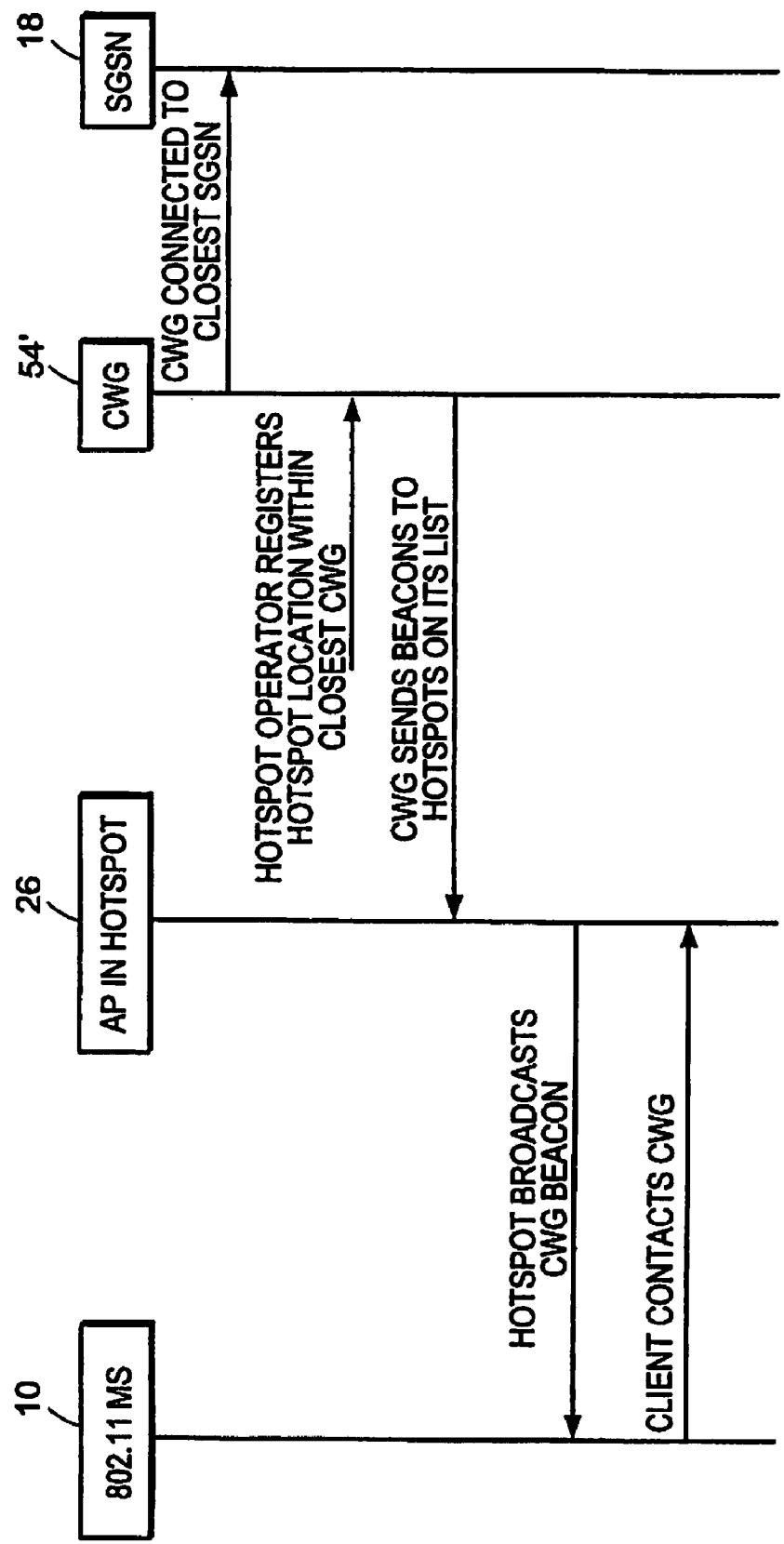
FIG. 6 is a diagram illustrating a CWG initialization process in accordance with some embodiments of the invention.

As shown in FIG. 6, the CWG broadcasts its presence beacons periodically to all enabled hotspot locations. These locations, in turn, broadcast the beacons to respective internal networks.

Hotspot locations within a region can be associated with a particular CWG. This association can be determined based on geographic proximity. This CWG sends its broadcasts to those locations. Thus, clients in that region get associated with that CWG. This CWG, in turn, is connected preferably to the most proximate SGSN. A CWG connects to one SGSN. More than one CWG may be connected to a particular SGSN.

Figure 7:
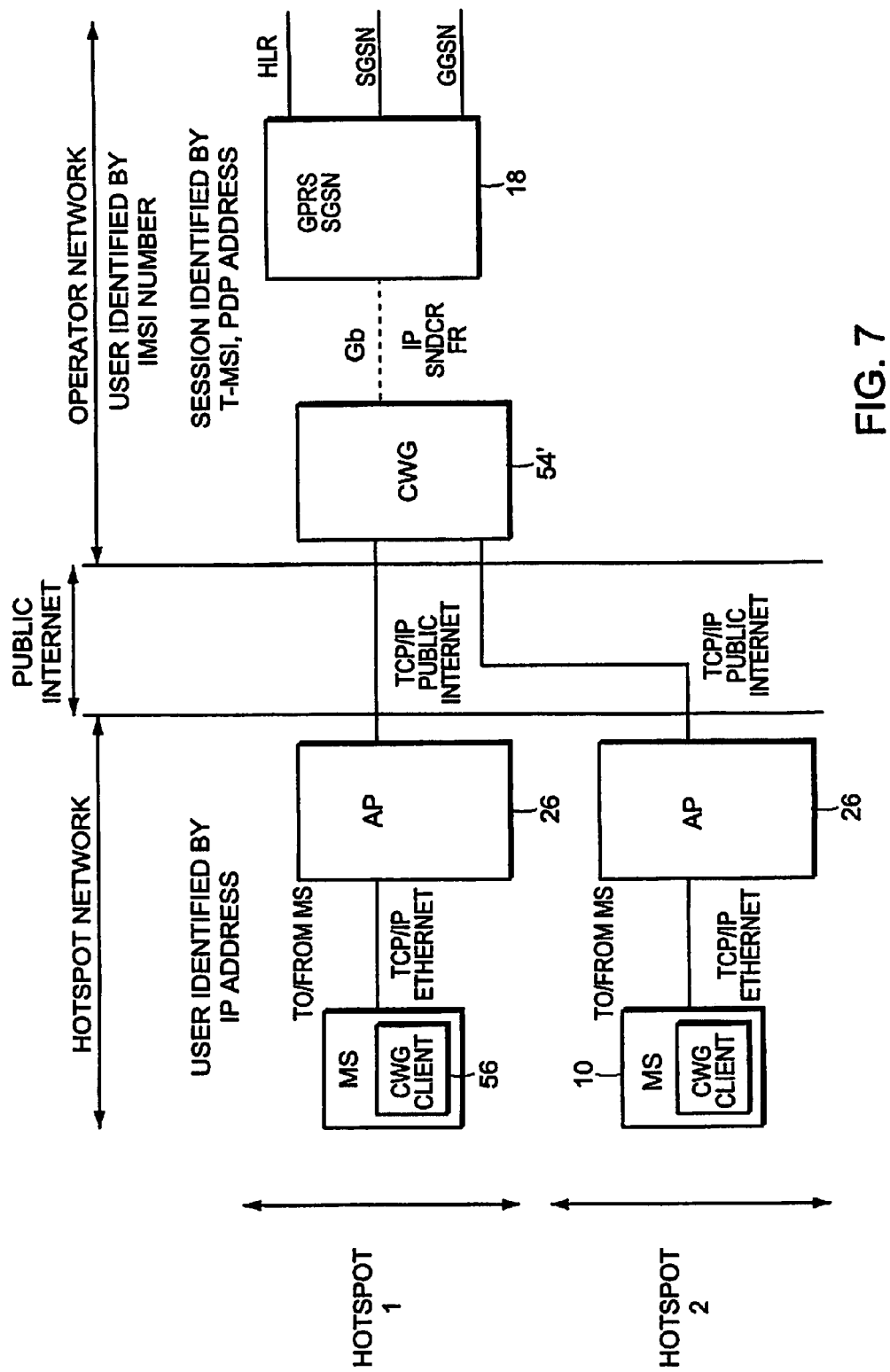
FIG. 7 is a schematic diagram illustrating CWG interfaces in accordance with some embodiments of the invention.

FIG. 7 illustrates the physical and the protocol interfaces for the CWG 54'. The CWG client 56 sends IP packets to the CWG 54' over the public Internet. The AP 26 within the hotspot is allowed to forward authentication requests as well as traffic for CWG clients 56. The CWG 54' receives TCP/IP packets over the Internet from the hotspot. The CWG 54' converts these packets to the GPRS format, in the IP and SNDCP (as defined by 3GPP TS 23.060) stack, and sends the converted packets to the SGSN 18. The SGSN 18 expects input from the GPRS BSS/PCU over a Frame Relay link. In order to emulate the BSS/PCU, the CWG 54' sends output packets over Frame Relay to the SGSN 18. Specifically, the CWG output interface resembles the Gb interface as specified in the GPRS standard.

As previously mentioned, the CWG can also allow traffic integration. Specifically, for services hosted by the carrier, traffic is allowed to and from the hotspot user to go through the carrier's network. In this case, the CWG client sends traffic to the CWG. This can be accomplished, e.g., either by tunneling the packets or by changing the header to send to the CWG. The CWG can then reroute the packets appropriately.

The 802.11 user can be identified within the GPRS network through his IMSI (a 15 bit unique non-dialable number that identifies the subscriber and subscription within the GSM network) identifier, while the particular session in the hot spot is associated with an IP address. The CWG can maintain this mapping between the two networks.

Figure 8:
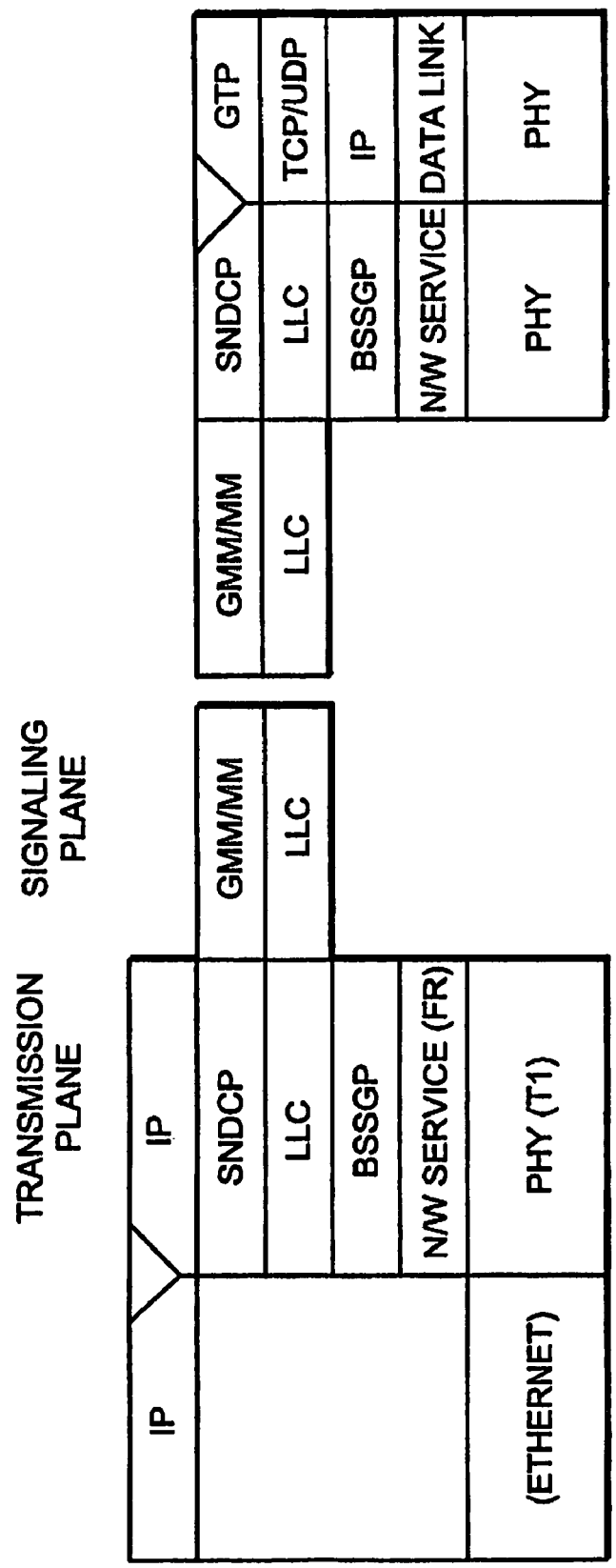
FIG. 8 is a schematic diagram illustrating a protocol stack for a CWG in accordance with some embodiments of the invention.

FIG. 8 shows the protocol stack within the CWG 54'. Specifically, the CWG 54' emulates a combination of the protocol stacks on the mobile station and the Base Station PCU. The stack for the transmission and the signaling plane is shown in FIG. 8. The CWG 54' gets incoming IP packets from the MS 10 and adds SNDCP headers as well as BSSGP (as defined in 3GPP TS 23.060) headers. The receiving SGSN 18 processes these packets as though they came from a GPRS MS over the GPRS BSS link. On the signaling side, the CWG 54' maintains the GPRS Mobility Management and Session Management states for each user that it emulates.

The CWG maintains a set of states and data structures for each user who connects through it. For each user, the permanent IMSI identifier maintained by the GPRS network is used for authentication and billing. For each session, the 802.11 user might have a different IP address within the hot spot. Each session is identified on the hot spot side by an IP address. The CWG maintains a mapping of the IP address with the IMSI ID on the GPRS side.

Figure 9:
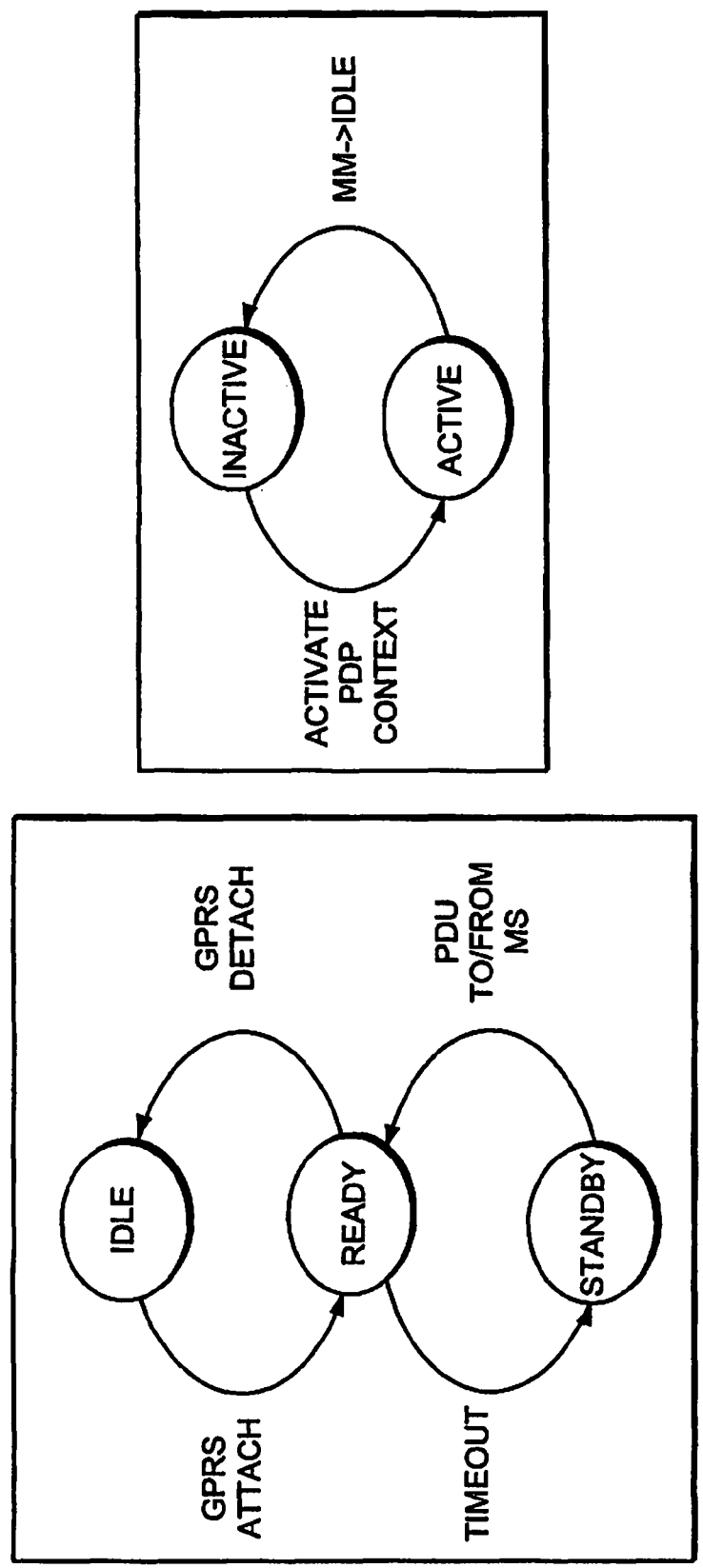
FIG. 9 is a schematic diagram illustrating a per user state machine maintained by a CWG for each mobile station (MS) in accordance with some embodiments of the invention.

Each MS 10 can be in one of three GPRS states: idle, ready, and standby. An MS moves from idle state to ready state after it attaches itself with the GPRS network. It moves from the ready state to the standby state after extended period of inactivity. It moves from standby state to ready state when it is ready to send/receive data. In a typical GPRS network, the MS maintains these states. In the converged network, the CWG 54' maintains these states for each hotspot user it supports. FIG. 9 shows a state machine that the CWG 54' maintains for each MS 10.

Figure 10:
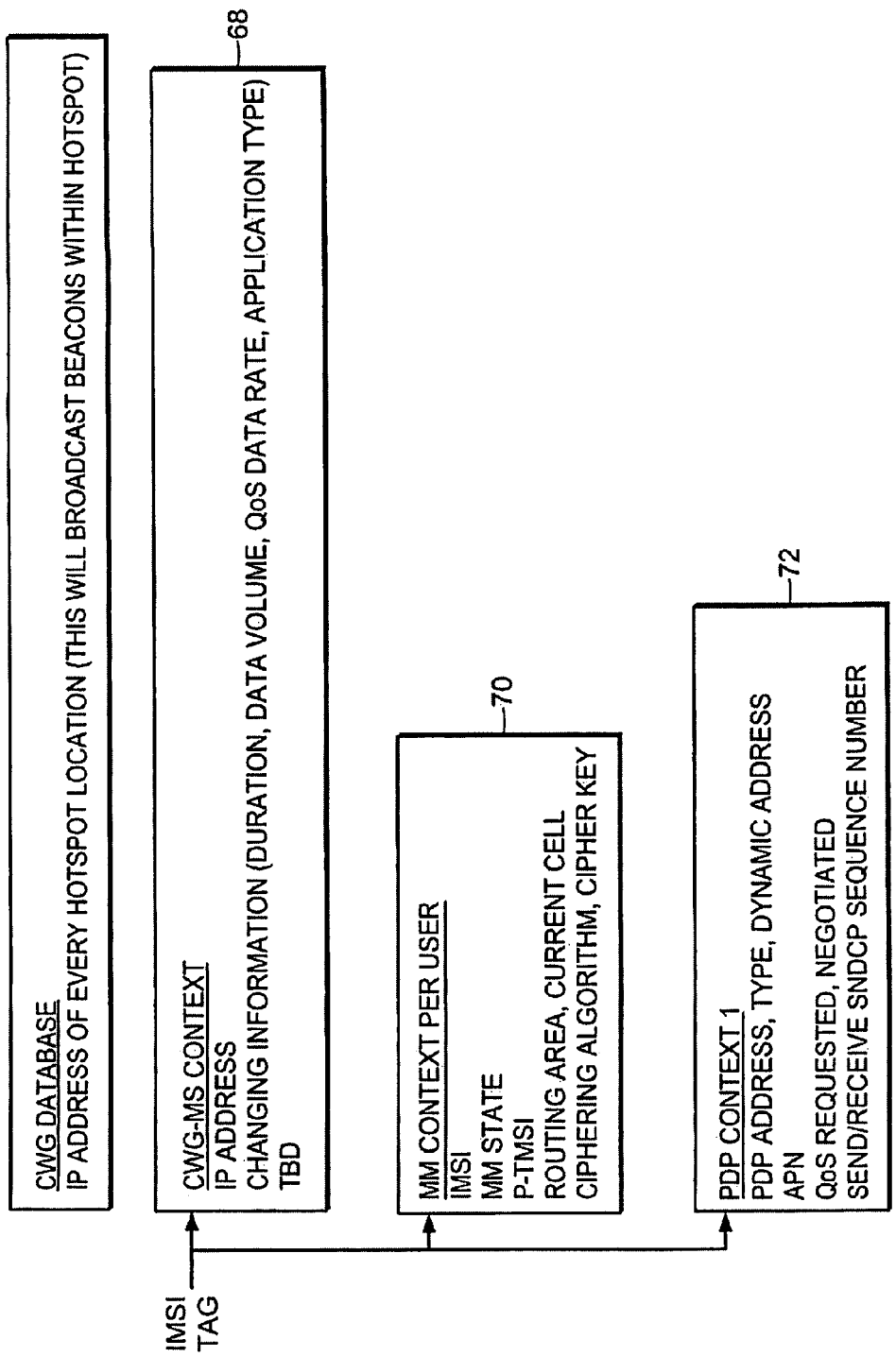
FIG. 10 is a diagram illustrating states maintained by the CWG for users in accordance with some embodiments of the invention.

FIG. 10 shows the state maintained for each user within the CWG 54'. The IMSI number from the GPRS network uniquely identifies each user. The session is identified by the IP address from the hotspot. The shaded box 68 shows the state specific to the CWG, including the IP address, 802.11 security information, as well as specific charging information that may be collected. The CWG 54' also maintains the Mobility context 70 as well as the PDP context 72 for each user, which would otherwise have been maintained by the GPRS MS.

The architecture of the client software on the MS is now described. As mentioned earlier, when a user subscribes to a hotspot service from the wireless carrier, the operator downloads a thin client and some software on the user terminal. The operator also stores identification information on the client. (If the client has a SIM Card functionality, this information could be read from the SIM card as well).

Figure 11:
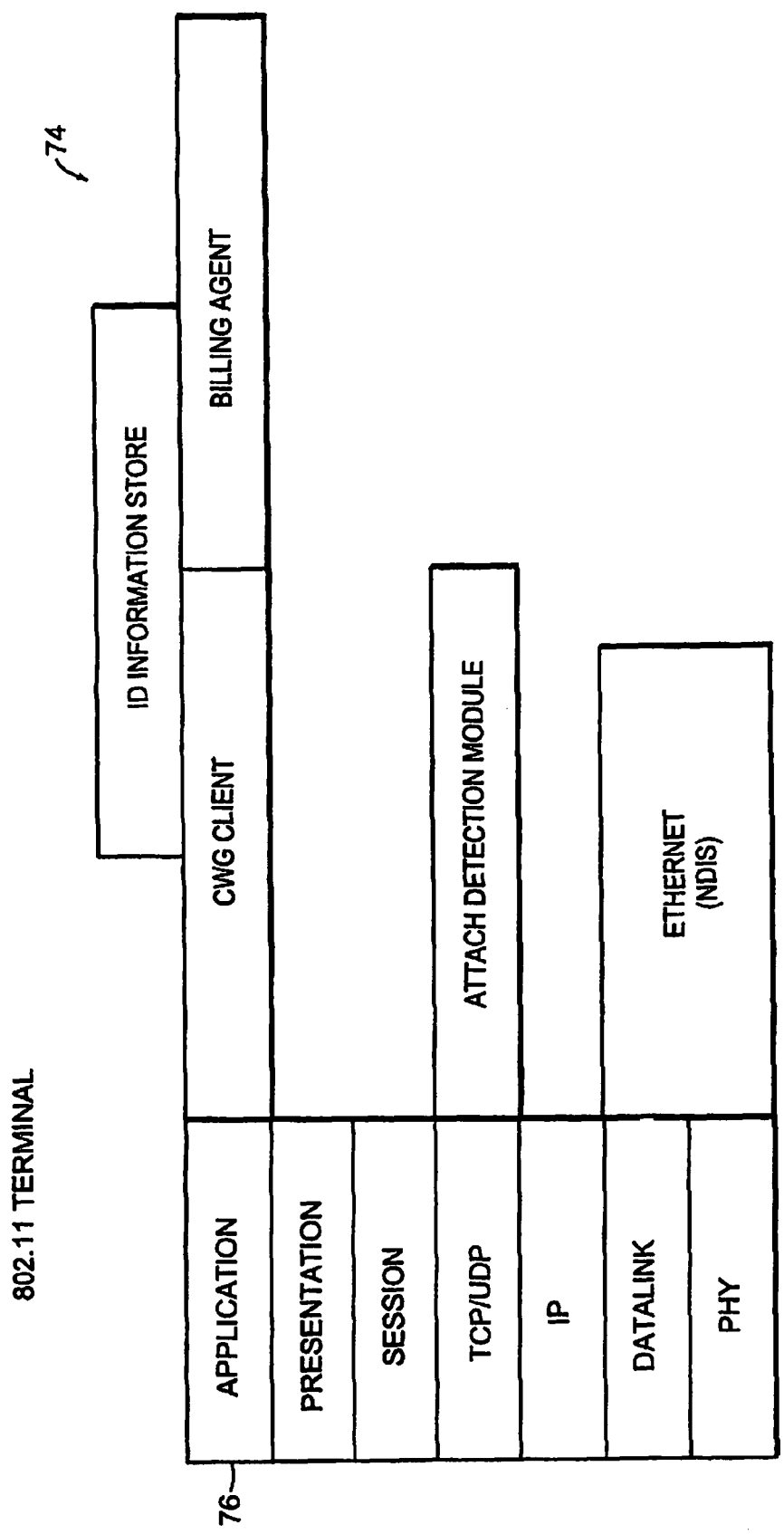
FIG. 11 is a schematic diagram illustrating the structure of CWG client software in accordance with some embodiments of the invention.

FIG. 11 shows the general structure of the client software 74. This architecture does not require a GPRS stack to be present on the client.

The functions of the application layer 76 software can include the following: (1) detect 802.11 network interface activity to determine if it is in the 802.11 vicinity; (2) scan for CWG beacons and request for login with the CWG; (3) send identification information to the CWG; (4) tunnel and de-tunnel packets to the CWG for applications that need to go through the GPRS network; and (5) billing and monitoring capability for usage tracking.

The client can be responsible for determining which packets are tunneled to the CWG. Authentication information is sent to the CWG. In case of application traffic, the CWG client either sends the traffic directly to the hotspot, or tunnels it to the CWG. In the first case, the hotspot allows the traffic to go through as if it were normal 802.11 traffic. In the second case, the CWG client tunnels the traffic to the CWG, emulating a point-to-point link. The CWG then detunnels the data, converts it to GPRS format, and sends it to the SGSN. For incoming traffic, the CWG receives data from the GPRS network, tunnels it to the CWG client over the public Internet, and the client detunnels the packets. Tunneling can be accomplished either by a IP in IP tunnel, or by changing header information.

To determine which services need tunneling and which do not, the client is programmed with applications that are directed to the GPRS network. As new applications are added, the client can be updated as needed. This can be accomplished through the CWG checking the version of the client and automatically upgrading it, if necessary.

In order to enable seamless sessions, the client should support multiple access technologies. For instance, a client can have a dual mode NIC, with GPRS and 802.11 support. One example of such a dual mode card is the so-called "D211" card available from Nokia. If the user starts a session in the GPRS network, but moves to a hotspot region, the terminal senses the presence of a 802.11 interface. In this case, it is preferred that the user switch over the 802.11 network. This preferably happens transparent to the user. While this happens, the client's session should also remain active. Dual mode NICs should have driver support to seamlessly transfer the application traffic to the appropriate driver. (Specifically, the selection of the appropriate air interface can be done by either signal strength or by pre-defined preferences.)

If the user has two network interface cards, additional software functionality can be supported on the NIC so as to determine the network interface to forward the traffic to. For example, a network layer shim module that will send traffic to the appropriate NIC can accomplish this.

Figure 12:
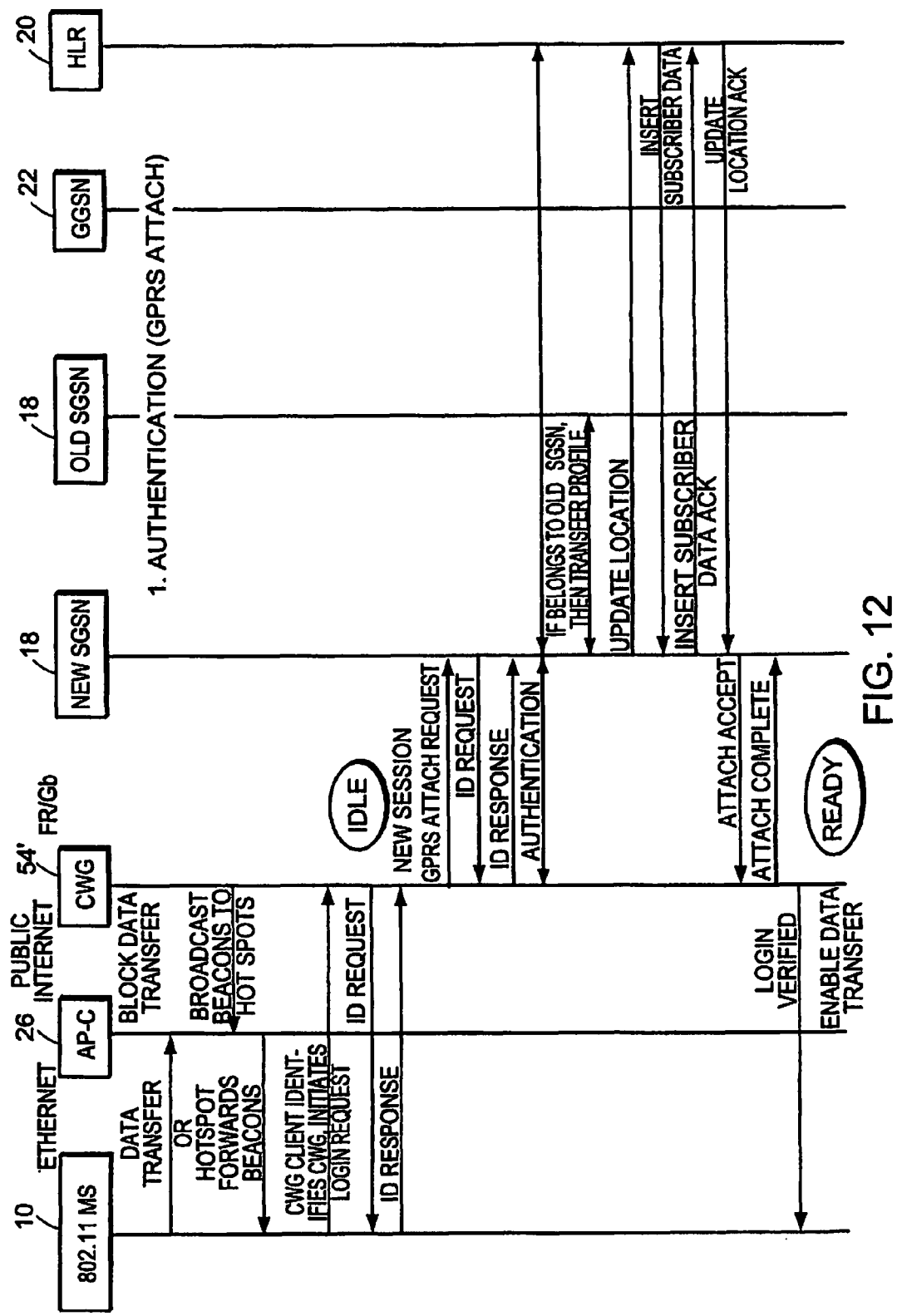
FIG. 12 is a diagram illustrating a client authentication process in accordance with some embodiments of the invention.
Figure 13:
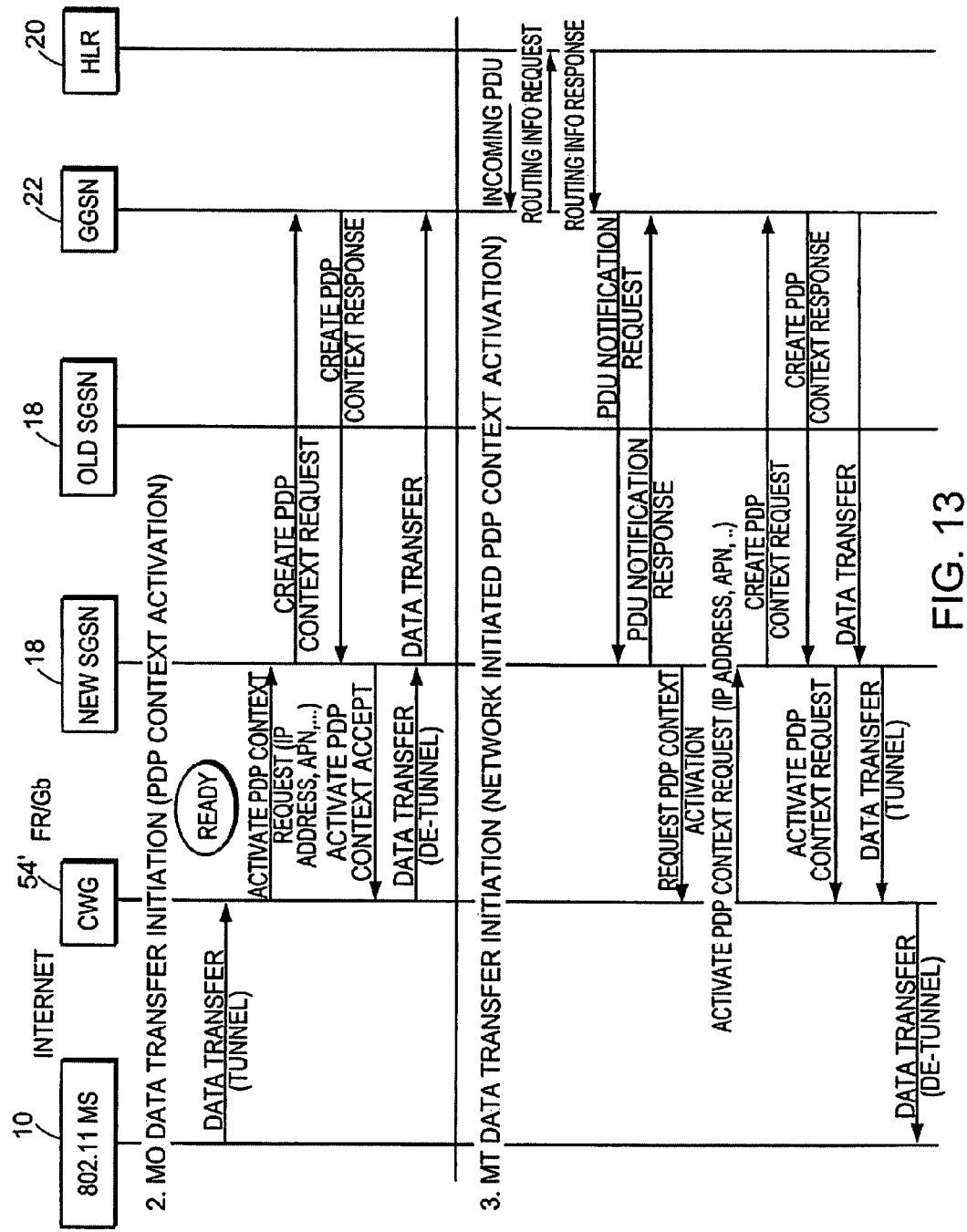
FIG. 13 is a schematic diagram illustrating CWG context creation in accordance with some embodiments of the invention.

The sequence of operation is shown in the call flows of FIG. 12 and FIG. 13. To get authenticated, the 802.11 terminal 10 needs to first 'attach' itself to the GPRS network. This process includes authentication with the HLR 20. FIG. 12 shows the different steps in the process. The MS 10 requests login into the GPRS network. The CWG 54' queries the MS for its GPRS-specific information. This information can be stored into the MS at the time the user subscribed for the carrier's hotspot service. The client 56 on the MS 10 provides this information to the CWG 54', preferably transparent to the enduser. The CWG 54' in turn makes an attach request to the SGSN 18 on behalf of the user. The SGSN 18 processes this as a native GPRS attach process. Once the GPRS user has been attached, the user is authenticated into the network. Once the user is authenticated, the MS is in the 'ready' state.

Once a MS is attached, a Packet Data Protocol (PDP), e.g., IP, context is created for each data session. The CWG creates the PDP context as shown in FIG. 13. In case of pull applications, the MS 10 requests a PDP session to be created. This is shown in step 2 in FIG. 13. For push applications, when data is received for a user at the GGSN 22, the GGSN queries the HLR 20 for the SGSN 18 controlling the user and sends a request through the SGSN 18 to the CWG 54' to create a PDP context for the session. The CWG 54' in turn creates a session and then traffic can be communicated to the MS 10 through the CWG 54'.

The attach step is sufficient to authenticate the 802.11 hotspot user into the GPRS network if only AAA integration is desired. For traffic integration, a PDP context is to be created.

The CWG architecture has an inherent ability to support seamless sessions and session mobility. As previously mentioned, the CWG enables the 802.11 hotspot to appear to the SGSN as a GPRS cell. As a result, the GPRS network sees an attached end user even when he is in a 802.11 network. Consequently, as the user moves from one cell to another, the SGSN manages mobility of the user as if it were a GPRS user.

To understand further how session integration works, consider the case where the end user started a session within the GPRS network. Also assume that the user has a dual mode terminal that is capable of accessing both air interfaces. The terminal can be designed to switch from the WAN (GPRS) interface to the 802.11 interface. This switch may be parameterized based on signal strength, giving priority to the 802.11 interface when present. When the MS detects a 802.11 network, the client on the MS sends a request to the CWG to attach itself to the GPRS network. When the CWG sends the attach information, the SGSN sees that the client was already attached from a previous base station. Consequently, it manages the mobility process as it would for a typical GPRS user moving from one BS to another. If the previous BS was controlled by the same SGSN, routing information does not need to be conveyed anywhere else. If the previous BS was attached to a different SGSN, the SGSN contacts the old SGSN, gets the information, and continues operation. When the user then moves back onto the WAN network, the new BS sends information to the SGSN and the same process repeats. Thus, session mobility is automatically supported by the inherent design of the CWG architecture.

One component of the AAA integration functionality is integrating billing information. Carriers can support an 'all you can eat' type of billing model for hotspot usage, where the user is charged a flat fee and can access any amount of data. In this case, there is no special need to measure actual data usage. However, if the carrier is interested in determining the actual amount of data used, the type of service used, or duration, the CWG client can be enhanced to collect some of the billing information. Since the data may not all flow from the CWG, the client can measure this information. This information can be obtained by reading the packets transferred at the network interface. The traffic that flows through the actual carrier's network can be metered by the SGSN as normal GPRS traffic.

The network architecture for the CWG to operate with the GPRS network is now described. As previously mentioned, the CWG concept can be extended to support several interfaces. For instance, the CWG can allow integration between 802.11 and CDPD or other circuit switched data. Similarly, the CWG can be designed to support other 2.5 G technologies, such as 1×RTT. Other wireless data technologies, such as Metricom or private wireless networks can also be extended to connect to the carrier's core data network through the CWG.

Other possible features included within the CWG are now described. In addition to the AAA, traffic, and session integration functions, the CWG can be expanded to support several other features. First, a cache can be included within the CWG. This can provide fast access to frequently accessed information from the hotspot. In addition, this can lead to a saving of backhaul bandwidth from the hotspot. Second, since the billing system for the hotspots could be different from the billing policies deployed in the GPRS network, the CWG can collect billing information for the 802.11 sessions, such as application type, volume of data, QoS, session duration etc. This information can be stored in IPDR (IP data records as specified by ipdr.org consortium) format and can be provided to the carrier's billing system. Third, the CWG can also manage mobility within the LAN, as clients move from one AP to another. Fourth, since the devices used in the hot spot could have a form factor different from the form factor that the applications are designed for, a transcoding functionality could also be included within the CWG.

CWG Deployment Using SGSN Emulation

CWG deployment using SGSN emulation is now described. This alternative approach lets the CWG function as an SGSN. One advantage of this approach is that it avoids the need to process the Gb interface and the frame relay connection. This is of advantage because of the reduced complexity as well as the reduced overhead of additional protocol layers. Also, this design leverages a lot of the core SGSN functionality, which is well-defined.

Figure 14:
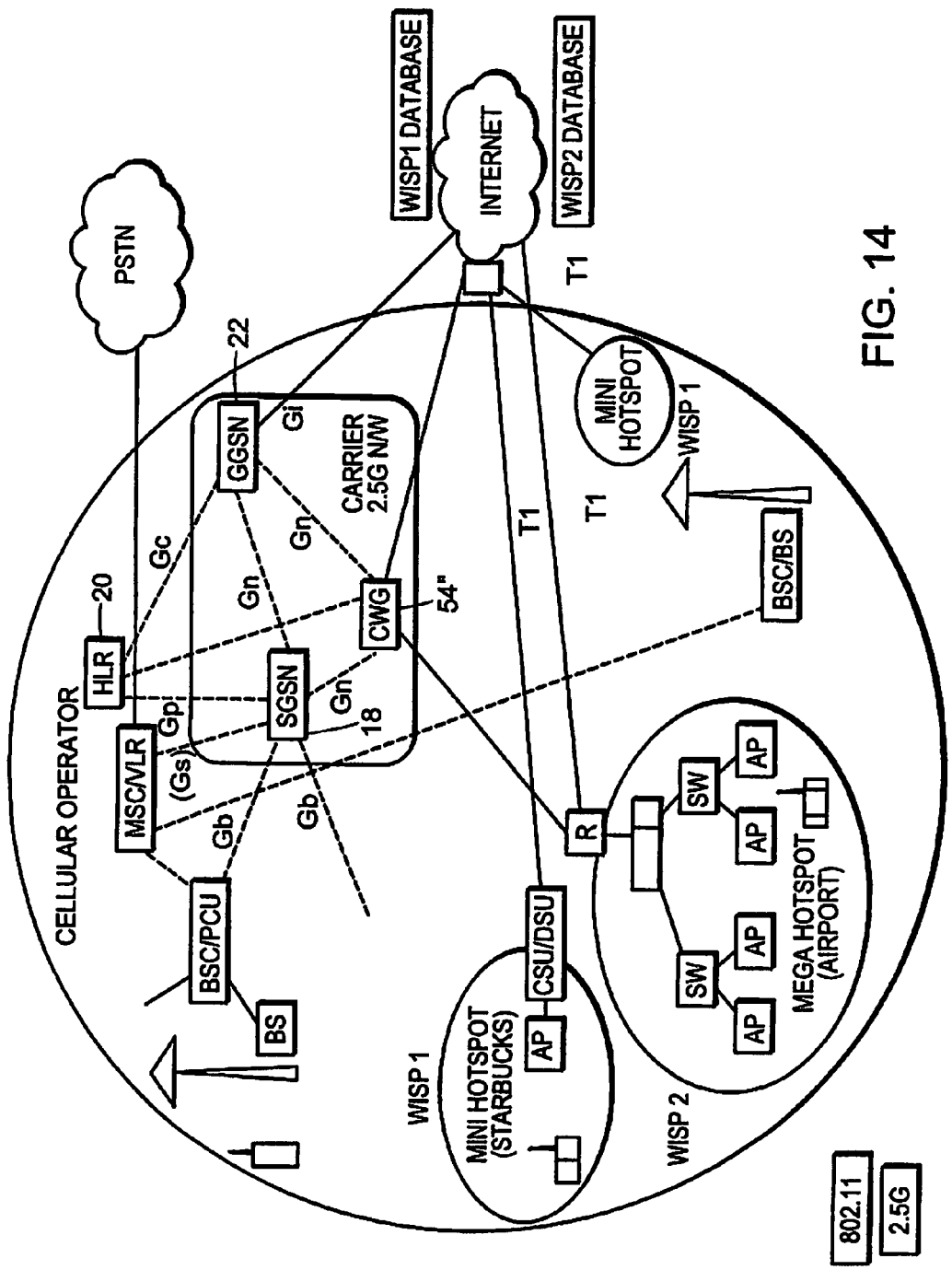
FIG. 14 is a schematic diagram illustrating a system architecture for a CWG through SGSN emulation in accordance with some embodiments of the invention.

FIG. 14 illustrates the system architecture for the CWG 54" through SGSN emulation. The CWG 54" emulates an SGSN 18 on the GPRS network side and an IP interface on the wireless LAN side. The CWG 54" implements a Gn interface to communicate with other SGSNs 18 and GGSN 22 over the GTP protocol. It also interfaces with the HLR 20 over the Gr interface to get authentication information.

On the LAN side, traffic from the hotspot is directed through the CWG following a network aggregator. The network aggregator can have a dedicated link that connects to the CWG.

Figure 15:
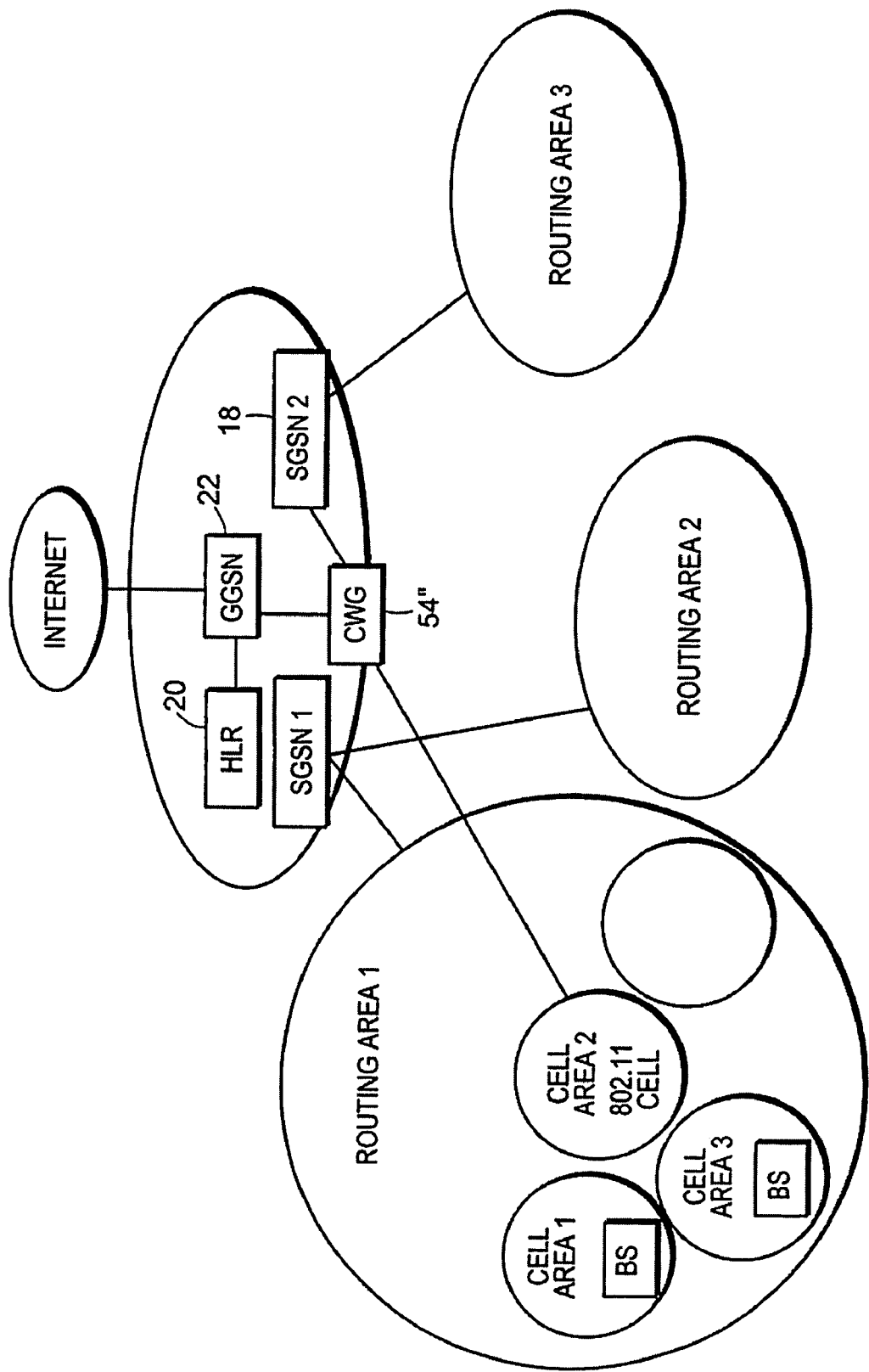
FIG. 15 is a schematic diagram illustrating a system design for a CWG with SGSN emulation in accordance with some embodiments of the invention.

FIG. 15 illustrates the operation principle of the CWG 54". The CWG connects to 802.11 hotspots and appears to be a SGSN from the GPRS network point of view. As a user moves from the WAN to the LAN, he attaches to the hotspot. This routes traffic to the CWG 54". The CWG authenticates the user as if it were authenticating a GPRS user by doing a GPRS attach. It receives authentication information from the terminal similar to the case described in the BS emulation approach. The CWG works with the SGSN 18 to manage a handoff, since to the other SGSN it appears that the user is just moving to a different SGSN.

Figure 16:
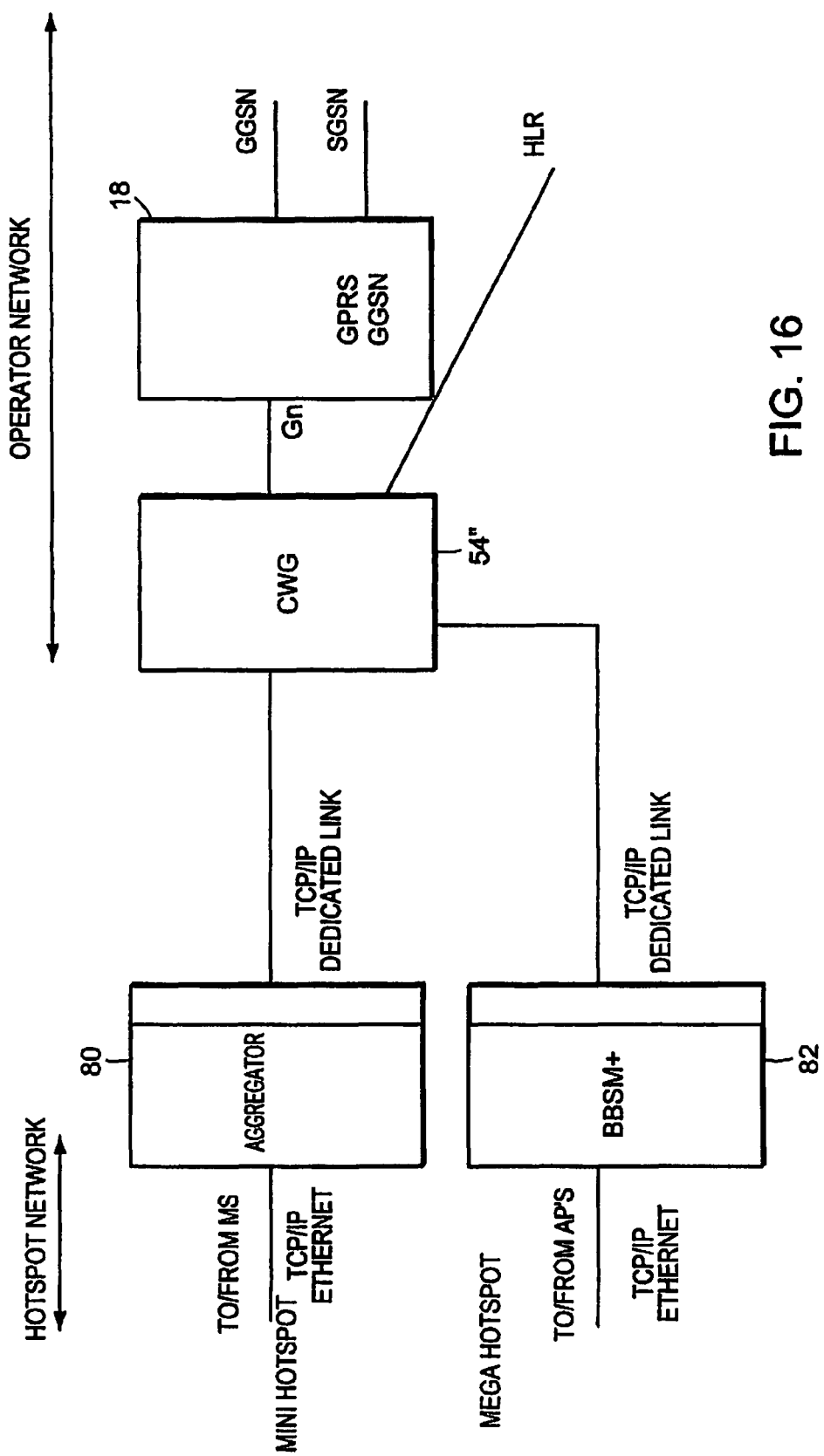
FIG. 16 is a schematic diagram illustrating system interfaces for an SGSN-based CWG in accordance with some embodiments of the invention.

As shown in FIG. 16, the CWG 54" interfaces with the SGSN 18 over a Gn link. It also connects to the GGSN 22, HLR 20 and other components in the GPRS network as a SGSN. On the hotspot side, it receives hotspot data over a dedicated link coming from the hotspot.

CWG Deployment Through a GGSN Interface

Figure 17:
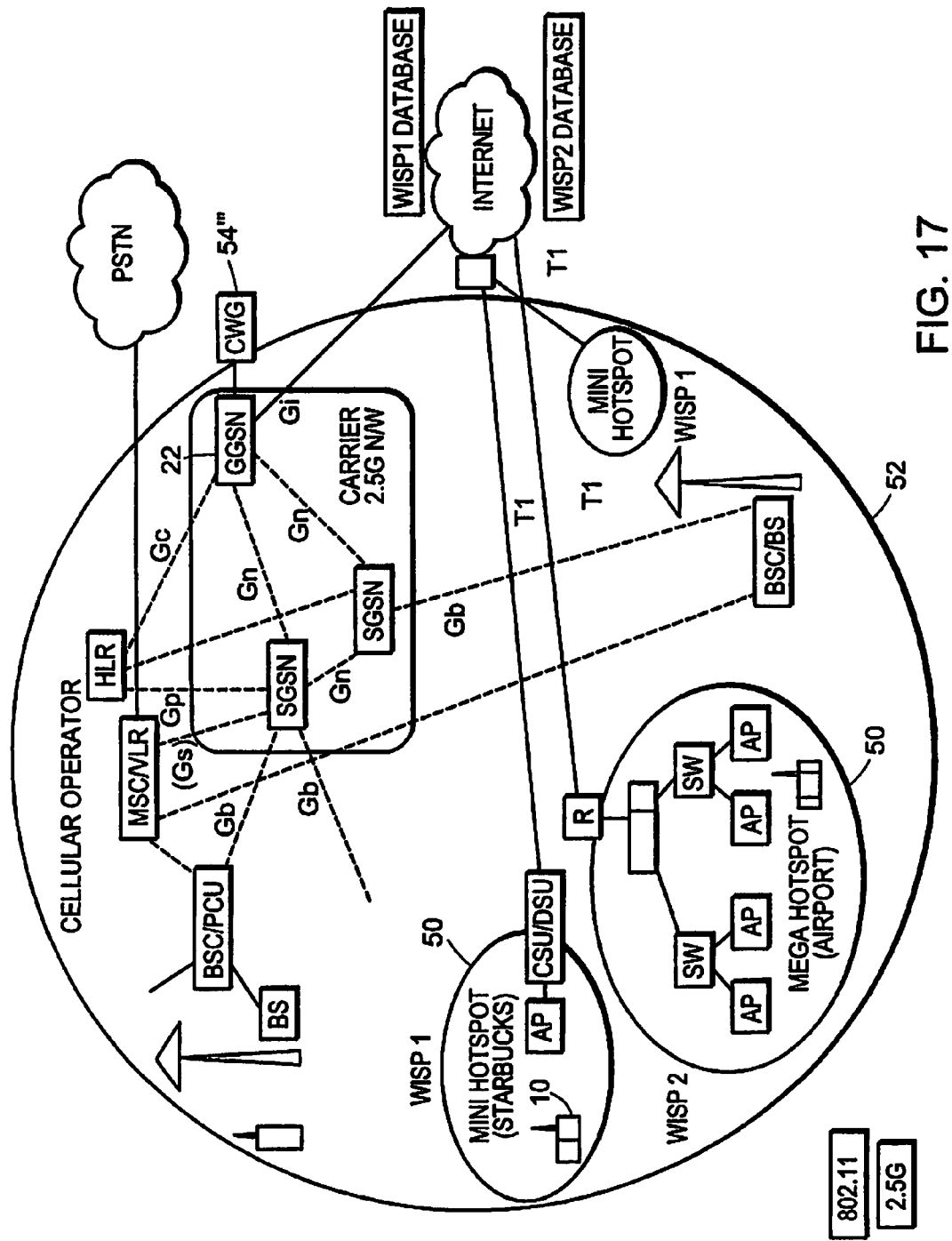
FIG. 17 is a schematic diagram illustrating a system architecture for a CWG connected through a GGSN in accordance with some embodiments of the invention.

FIG. 17 shows an alternate system architecture for the CWG where the CWG connects to the GPRS network through the public Internet. This architecture allows the carrier and the hotspot operator to integrate the LAN and WAN networks without having to deploy additional connections from the CWG to the SGSN. Accordingly, one advantage of this architecture is its ease of deployment.

This architecture comprises three components: the CWG, software modules associated with traffic aggregators in the hotspot, and client software on the MS.

The CWG 54''' is attached to the public Internet side of the GGSN 22. The CWG can be attached to the GGSN, along with other servers that it typically hosts. The CWG 54''' is responsible for communication with the clients in the hot spot locations. It receives authentication requests from the MS 10, authenticates the user with the GPRS network 52, and then allows traffic to be pushed to the MS 10 in the hotspot 50.

Software modules associated with traffic aggregators 80 in the hotspot are responsible for gating access to the network before the 802.11 user is authenticated. The traffic from multiple mini hotspots is typically aggregated somewhere in the wireless hot spot operators' network before being sent out on the public Internet. Similarly, in the mega hotspot, concentration devices 82 (e.g., Cisco's Broadband service manager BBSM) collect all the traffic from the mega hotspot before routing it to the public Internet. In both these cases, there is need to first authenticate the user with the WAN before the traffic can go through. The GGSN-based CWG design addresses this through a small software module that is added to the existing hotspot aggregation software. This software could be either integrated into the existing hotspot aggregation software or provided through a separate device. In FIG. 17, this is shown as the shaded part in the mega hotspot and the small box for the mini hot spot aggregation point.

Client software on the mobile station includes the information downloaded by the operator as in the case of the CWG deployment previously described. This software communicates with the CWG to authenticate the user with the GPRS network.

Figure 18:
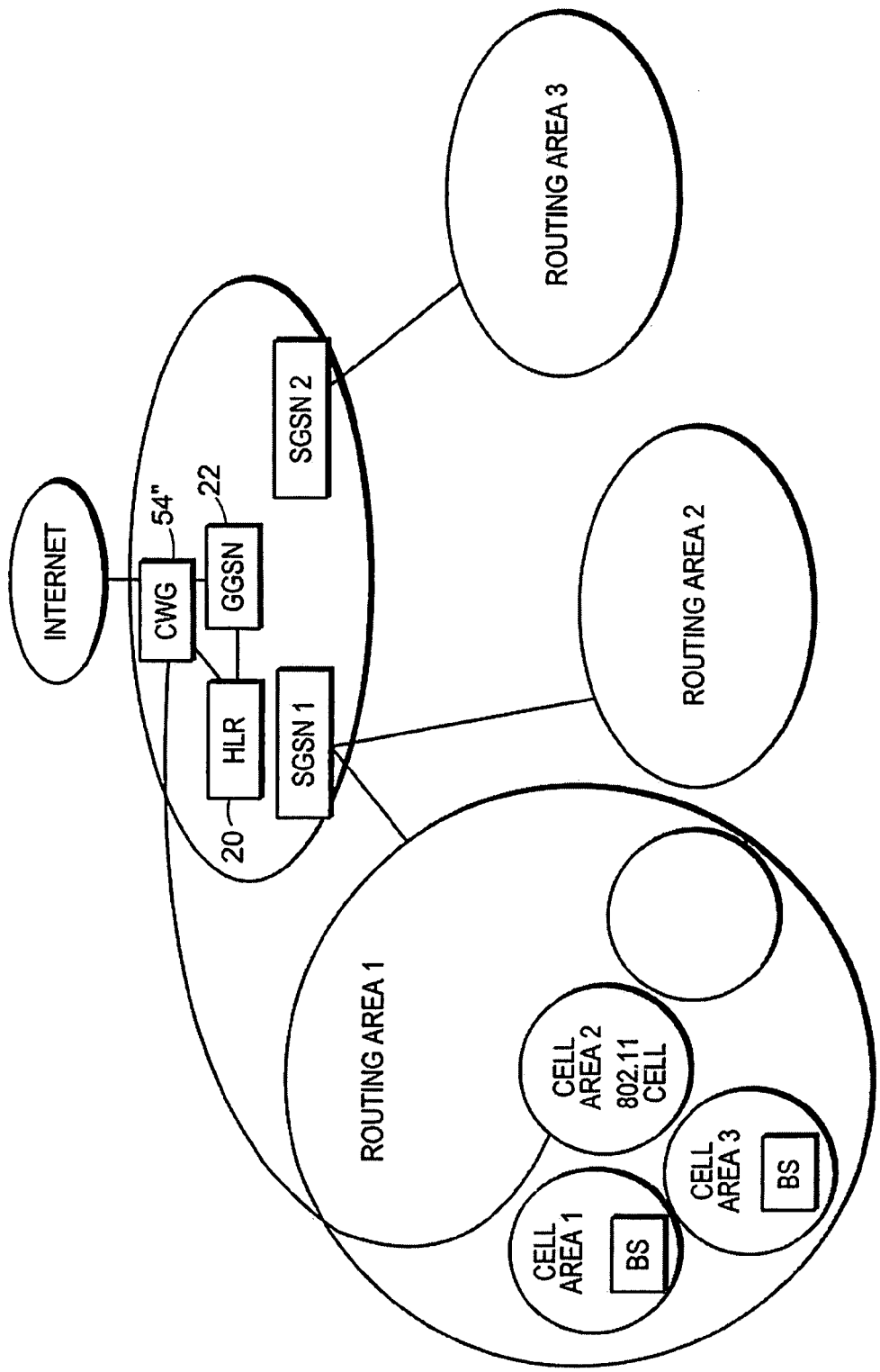
FIG. 18 is a schematic diagram illustrating a system design for a GGSN-based CWG in accordance with some embodiments of the invention.

The system operation logic is described in FIG. 18. Traffic from the 802.11 cell is routed over the public Internet to the CWG 54''', which is connected to the GGSN 22. The CWG 54''' uses the GGSN 22 to get authentication information from the HLR 20 and passes that back to the MS 10 in the hotspot.

In this architecture, the CWG logically emulates the MS and parts of the SGSN functionality.

Figure 19:
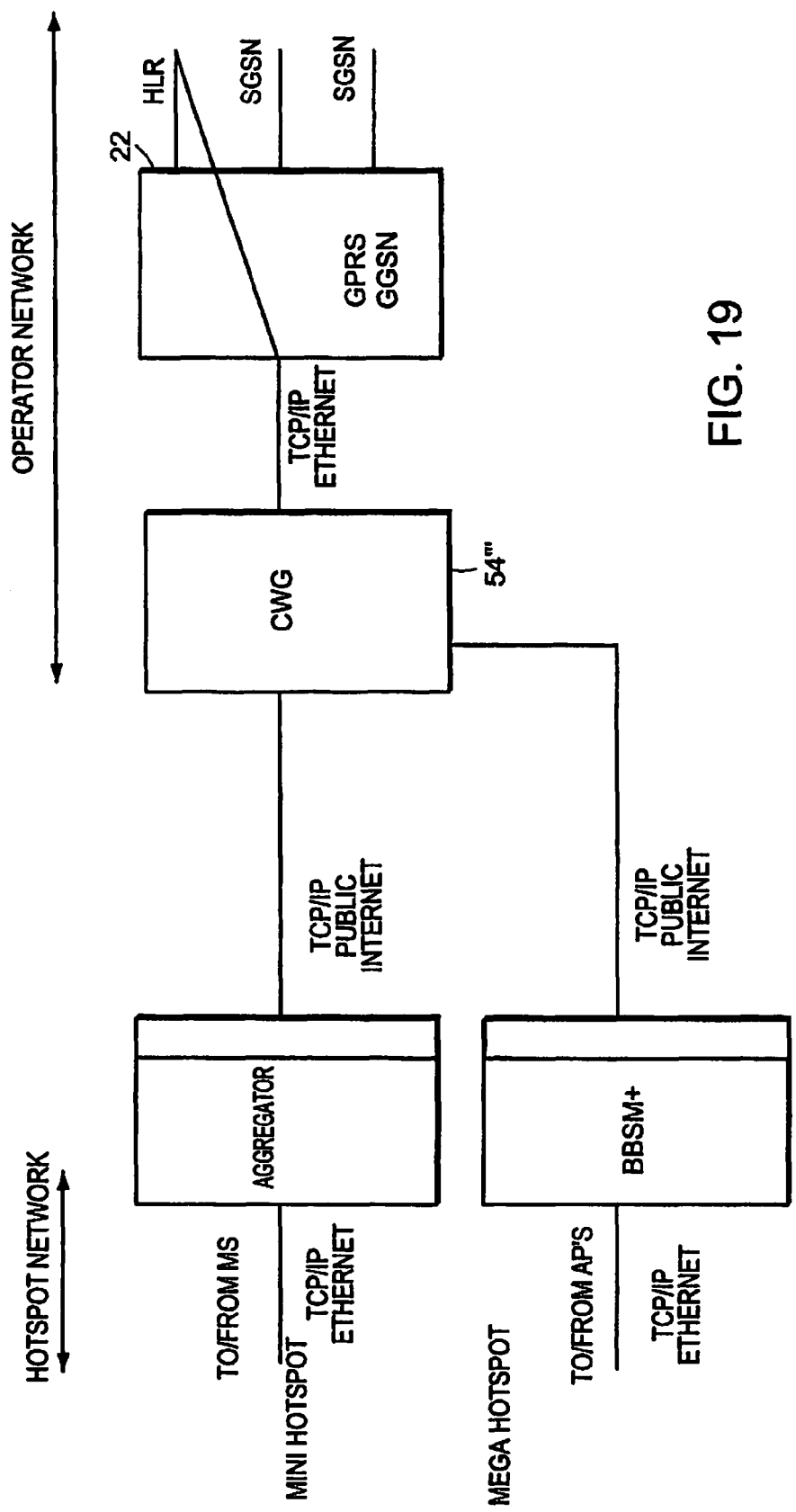
FIG. 19 is a schematic diagram illustrating system interfaces for a GGSN-based CWG in accordance with some embodiments of the invention.

The interfaces for the GGSN-based CWG 54''' deployment solution are shown in FIG. 19. For the mini hotspot, the software module is added to the aggregator. This communicates over TCP/IP over the public Internet to the CWG 54'''. The CWG communicates to the HLR 20 through the GGSN 22. The CWG functionality is to emulate parts of the MS and the SGSN functions. For the mega hotspot, the software module is added to the aggregation software and communicates with the CWG as before.

Figure 20:
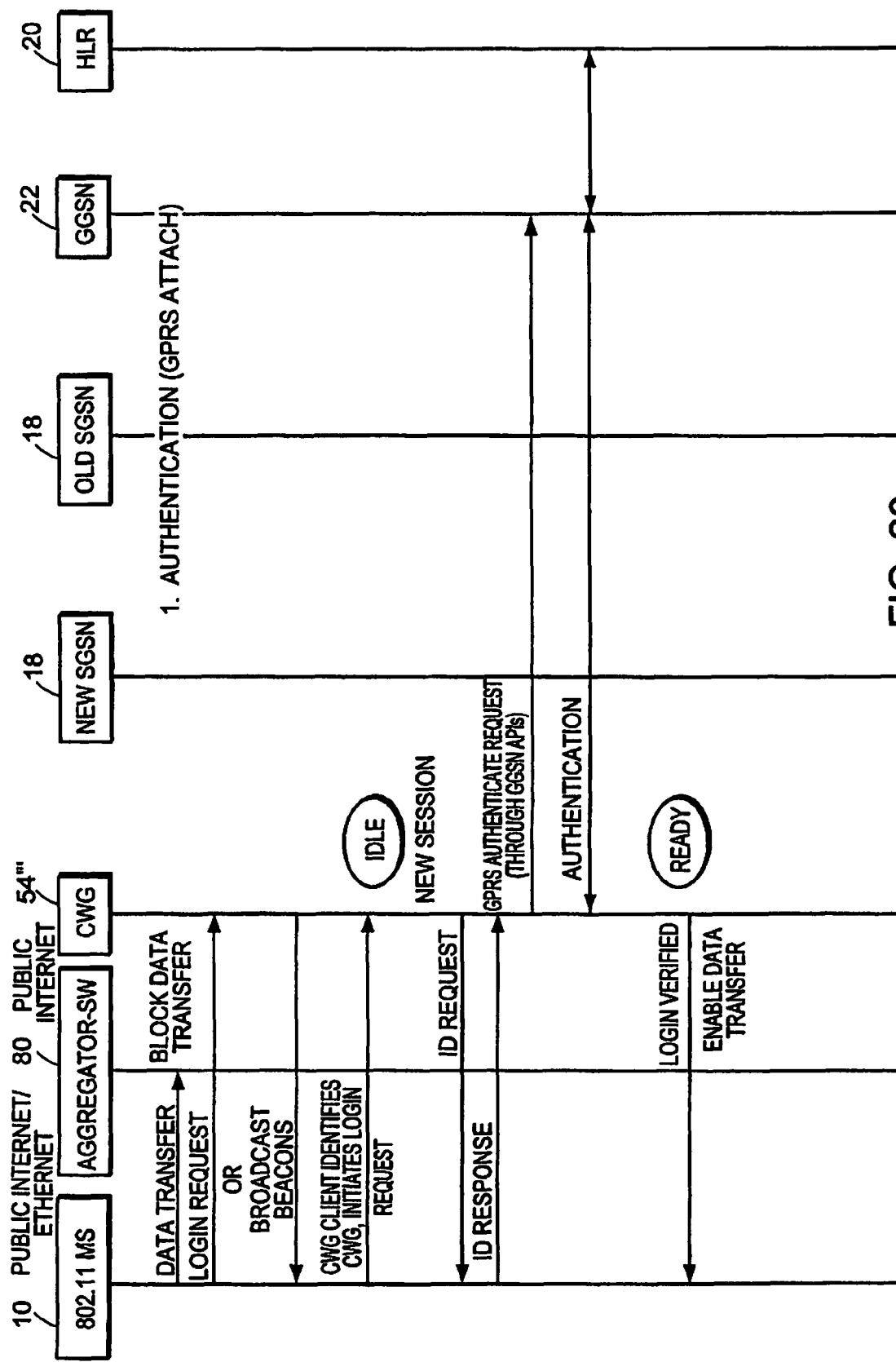
FIG. 20 is a diagram illustrating call flow for a GGSN-based CWG in accordance with some embodiments of the invention.

The call flow for the authentication process is shown in FIG. 20. Traffic from the user MS 10 goes to the aggregator software 80. This blocks traffic until the user is authenticated. The client software accesses the CWG 54''', which communicates with the GGSN 22 and HLR 20 to authenticate the user. Once the user is authenticated, data transfer is enabled. PDP context activation takes place in generally the same way.

Having described preferred embodiments of the present invention, it should be apparent that modifications can be made without departing from the spirit and scope of the invention.

What is claimed is:

1. A system in a wide area wireless network operated by a service provider and comprising at least one node of a first type that routes traffic to and from the wide area wireless network into a public Internet, and one or more nodes of a second type each of which manage mobility of a wireless client device in the wide area wireless network, and wherein a given node of the second type authenticates a wireless client device by accessing a database associated with the wide area network, wherein the system further comprises:

a gateway to which an access device of a wireless local area network is connectable, the gateway being associated with the wide area wireless network and being either (a) connectable to a node of the first type to enable the wireless local area network access device to appear to the node of the first type as a node of the second type, or (b) connectable to a node of the second type to enable the wireless local area network access device to appear to the node of the second type as a base station/packet control unit of the wide area wireless network; and a client software program having computer executable instructions in said wireless client device to enable the wireless client device while operating within the wireless local area network, to use the gateway to access the database and thereby provide seamless session integration as the wireless client device moves between respective coverage areas of the wide area wireless network and the wireless local area network, wherein the gateway provides the seamless session integration, by (a) emulating the node of the second type when the gateway is connected to the node of the first type, or (b) emulating the base station/packet control unit when the gateway is connected to the node of the second type;

wherein the gateway generates billing data identifying a charge for use, by the wireless client device, of the wide area wireless network.

2. The system as described in claim 1 wherein the gateway is an IP-accessible device, the node of the first type is a Gateway GPRS Service Node (GGSN) and the node of the second type is a Serving GPRS Service Node (SGSN).

3. The system as described in claim 1 wherein, following an authentication by the gateway, a user of the wireless client device obtains access to a service available in the wide area wireless network.

4. The system as described in claim 1 wherein the wide area wireless network is a GPRS or Ix Radio Transmission Technology (1×RTT) network.

5. The system as described in claim 1 wherein the database is a Home Location Register (HLR).

6. The system as described in claim 1 wherein the gateway is deployed at an ISP Point of Presence (POP) or data center.

7. The system as described in claim 1 wherein the wireless local area network is an 802.11 network.

* * * * *

UNITED STATES PATENT AND TRADEMARK OFFICE
CERTIFICATE OF CORRECTION

PATENT NO. : 7,782,848 B2  Page 1 of 1
APPLICATION NO. : 11/772390
DATED : August 24, 2010
INVENTOR(S) : Asawaree Kalavade et al.

It is certified that error appears in the above-identified patent and that said Letters Patent is hereby corrected as shown below:

In the Claims:

Column 16, Claim 4, Line 19, delete the portion of text reading "Ix Radio" and replace with --1x Radio--.

Signed and Sealed this

Sixteenth Day of November, 2010

David J. Kappos
*Director of the United States Patent and Trademark Office*